US012627811B2

(12) United States Patent
Santamaria Gomez et al.

(10) Patent No.: US 12,627,811 B2
(45) Date of Patent: May 12, 2026

(54) METHOD, AN APPARATUS AND A COMPUTER PROGRAM PRODUCT FOR VIDEO CODING

(71) Applicant: Nokia Technologies Oy, Espoo (FI)

(72) Inventors: Maria Claudia Santamaria Gomez, Tampere (FI); Francesco Cricrì, Tampere (FI); Ruiying Yang, Tampere (FI); Honglei Zhang, Tampere (FI); Hamed Rezazadegan Tavakoli, Espoo (FI); Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/852,475

(22) PCT Filed: Feb. 13, 2023

(86) PCT No.: PCT/FI2023/050084
§ 371 (c)(1),
(2) Date: Sep. 29, 2024

(87) PCT Pub. No.: WO2023/194650
PCT Pub. Date: Oct. 12, 2023

(65) Prior Publication Data
US 2025/0211756 A1     Jun. 26, 2025

(30) Foreign Application Priority Data
Apr. 4, 2022     (FI) ..................................... 20225285

(51) Int. Cl.
H04N 19/147     (2014.01)
H04N 19/42     (2014.01)
H04N 19/85     (2014.01)

(52) U.S. Cl.
CPC ........... H04N 19/147 (2014.11); H04N 19/42 (2014.11); H04N 19/85 (2014.11)

(58) Field of Classification Search
CPC ....... H04N 19/147; H04N 19/42; H04N 19/85
See application file for complete search history.

(56) References Cited

U.S. PATENT DOCUMENTS

| | | | |
|---|---|---|---|
| 2018/0184123 A1 | 6/2018 | Terada et al. | |
| 2020/0311551 A1 | 10/2020 | Aytekin et al. | |
| 2022/0103839 A1 | 3/2022 | Van Rozendaal et al. | |

FOREIGN PATENT DOCUMENTS

| | | |
|---|---|---|
| CN | 111222532 A | 6/2020 |
| WO | 2021/255567 A1 | 12/2021 |

OTHER PUBLICATIONS

"Video coding for low bit rate communication", Series H: Audio-visual and Multimedia Systems, Infrastructure of audiovisual services—Coding of moving video, ITU-T Recommendation H.263, Jan. 2005, 226 pages.

(Continued)

*Primary Examiner* — On S Mung
(74) *Attorney, Agent, or Firm* — McCarter & English LLP

(57)     ABSTRACT

The embodiments relate to a method for encoding, comprising receiving a representation (1005) of input media to be encoded: encoding the representation (1005) to generate encoded bitstreams to be delivered to a decoder, and using encoder's de-coder-side neural network (en-DSNN) for decoding the encoded representation and/or post-processing the decoded representation: adapting (1030) the en-DSNN based at least on the representation or a signal derived from the representation and on an output of the en-DSNN or a signal derived from an output of the en-DSNN, thus obtaining a weight-update (1040) as a result: performing one or more iterations of compressing and decompressing the (Continued)

weight-update (1040) by using a weight-update codec: selecting values of one or more configuration parameters of the weight-update codec and using the selected values for a final compression of the weight-update (1040); and signaling the compressed weight update to a decoder.

4 Claims, 14 Drawing Sheets

(56) References Cited

OTHER PUBLICATIONS

"Advanced video coding for generic audiovisual services", Series H: Audiovisual And Multimedia Systems, Infrastructure of audiovisual services—Coding of moving video, ITU-T Recommendation H.264, Aug. 2021, 844 pages.
"High efficiency video coding", Series H: Audiovisual And Multimedia Systems, Infrastructure of audiovisual services—Coding of moving video, Recommendation ITU-T H.265, Aug. 2021, 716 pages.
"Versatile video coding", Series H: Audiovisual and Multimedia Systems, Infrastructure of audiovisual services—Coding of moving video, Recommendation ITU-T H.266, Aug. 2020, 516 pages.
"Versatile supplemental enhancement information messages for coded video bitstreams", Series H: Audiovisual and Multimedia Systems, Infrastructure of audiovisual services—Coding of moving video, Recommendation ITU-T H.274, Aug. 2020, 86 pages.
Office Action received for corresponding Finnish Patent Application No. 20225285, dated Oct. 18, 2022, 14 pages.
Lam et al., "Compressing Weight-updates for Image Artifacts Removal Neural Networks", arXiv, Jun. 14, 2019, pp. 4321-4325.
Wiedemann et al., "DeepCABAC: A Universal Compression Algorithm for Deep Neural Networks", IEEE Journal of Selected Topics in Signal Processing, vol. 14, No. 4, May 2020, pp. 700-714.
Young et al., "Transform Quantization for CNN Compression", IEEE Transactions on Pattern Analysis and Machine Intelligence, vol. 44, No. 9, Sep. 2022, pp. 5700-5714.
International Search Report and Written Opinion received for corresponding Patent Cooperation Treaty Application No. PCT/FI2023/050084 dated May 12, 2023, 18 pages.
Kirchhoffer et al., "Overview of the Neural Network Compression and Representation (NNR) Standard", IEEE Transactions on Circuits and Systems for Video Technology, vol. 32, No. 5, May 2022, pp. 3203-3216.

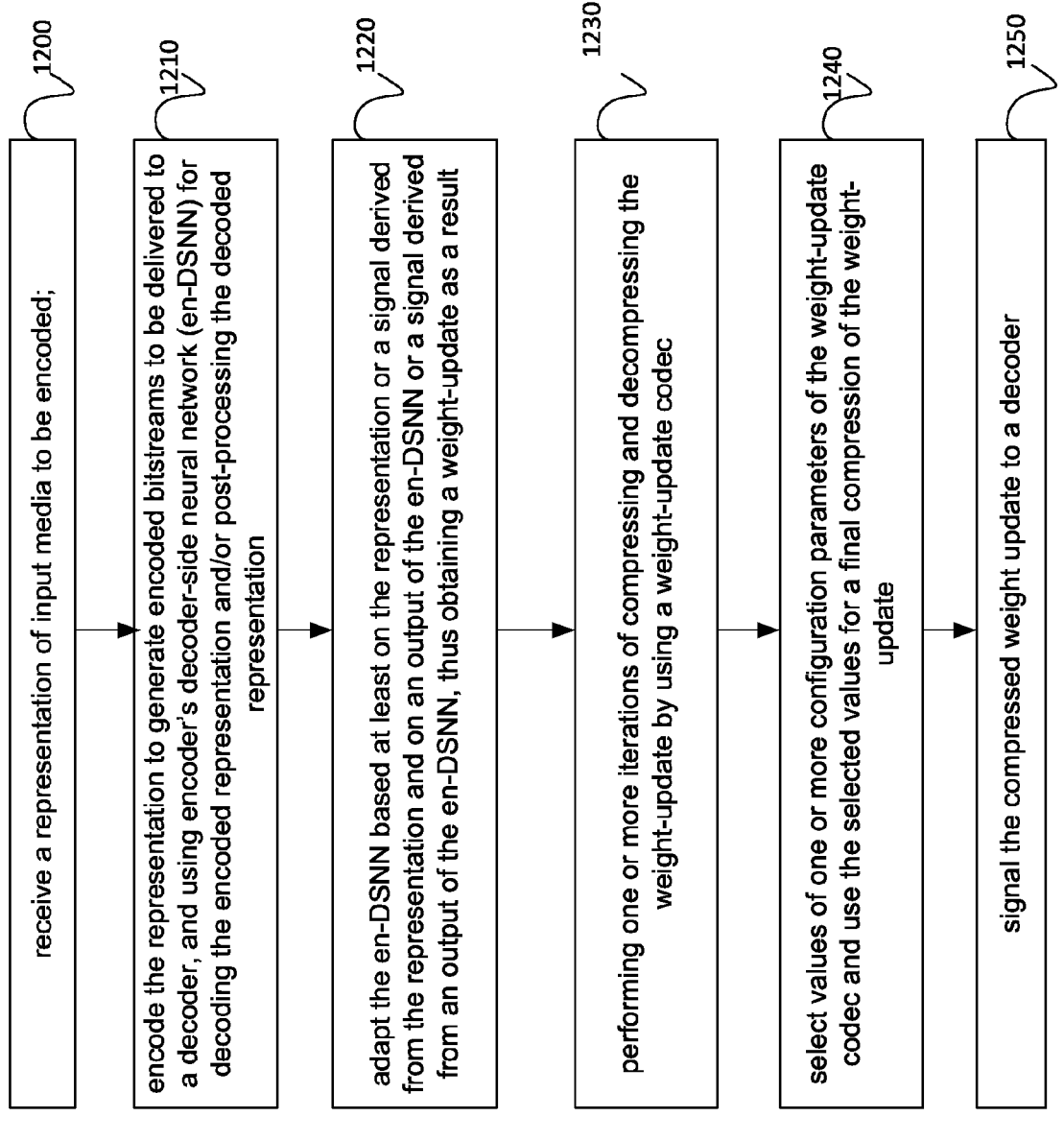

1200 receive a representation of input media to be encoded;

1210 encode the representation to generate encoded bitstreams to be delivered to a decoder, and using encoder's decoder-side neural network (en-DSNN) for decoding the encoded representation and/or post-processing the decoded representation 1220 adapt the en-DSNN based at least on the representation or a signal derived from the representation and on an output of the en-DSNN or a signal derived from an output of the en-DSNN, thus obtaining a weight-update as a result 1230 performing one or more iterations of compressing and decompressing the weight-update by using a weight-update codec 1240 select values of one or more configuration parameters of the weight-update codec and use the selected values for a final compression of the weight-update 1250 signal the compressed weight update to a decoder

Fig. 12

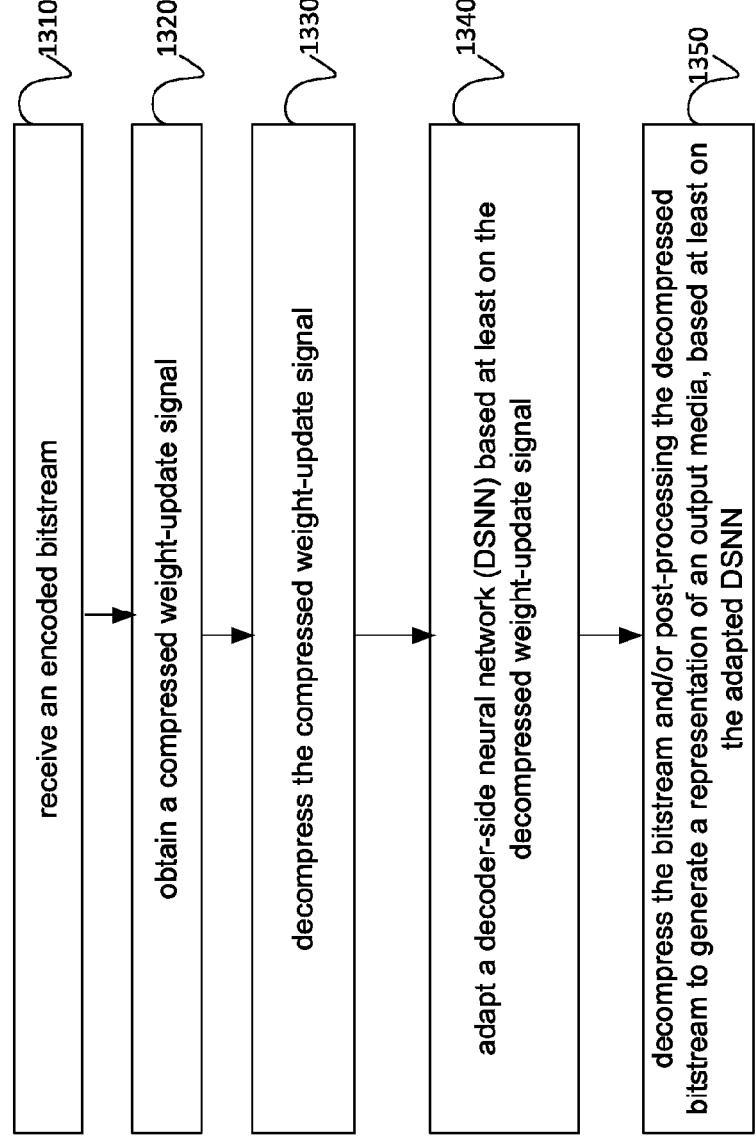

receive an encoded bitstream ⁓1310 obtain a compressed weight-update signal ⁓1320 decompress the compressed weight-update signal ⁓1330 adapt a decoder-side neural network (DSNN) based at least on the decompressed weight-update signal ⁓1340 decompress the bitstream and/or post-processing the decompressed bitstream to generate a representation of an output media, based at least on the adapted DSNN ⁓1350

Fig. 13

METHOD, AN APPARATUS AND A COMPUTER PROGRAM PRODUCT FOR VIDEO CODING

RELATED APPLICATION

This application claims priority to PCT Patent Application No. PCT/FI2023/050084, filed 13 Feb. 2023, which claims priority from Finland Application No. 20225285, filed on 4 Apr. 2022, which is incorporated herein by reference in its entirety.

The project leading to this application has received funding from the ECSEL Joint Undertaking (JU) under grant agreement No 876019. The JU receives support from the European Union's Horizon 2020 research and innovation programme and Germany, Netherlands, Austria, Romania, France, Sweden, Cyprus, Greece, Lithuania, Portugal, Italy, Finland, Turkey.

TECHNICAL FIELD

The present solution generally relates to video encoding and coding.

BACKGROUND

One of the elements in image and video compression is to compress data while maintaining the quality to satisfy human perceptual ability. However, in recent development of machine learning, machines can replace humans when analyzing data for example in order to detect events and/or objects in video/image. Thus, when decoded image data is consumed by machines, the quality of the compression can be different from the human approved quality. Therefore, a concept Video Coding for Machines (VCM) has been provided.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided an apparatus for encoding comprising means for receiving a representation of input media to be encoded; means for encoding the representation to generate encoded bitstreams to be delivered to a decoder, and means for using encoder's decoder-side neural network (en-DSNN) for decoding the encoded representation and/or post-processing the decoded representation; means for adapting the en-DSNN based at least on the representation or a signal derived from the representation and on an output of the en-DSNN or a signal derived from an output of the en-DSNN, thus obtaining a weight-update as a result; means for performing one or more iterations of compressing and decompressing the weight-update by using a weight-update codec; means for selecting values of one or more configuration parameters of the weight-update codec and using the selected values for a final compression of the weight-update; and means for signaling the compressed weight update to a decoder.

According to a second aspect, there is provided an apparatus for decoding, comprising means for receiving an encoded bitstream; means for obtaining a compressed weight-update signal; means for decompressing the compressed weight-update signal; means for adapting a decoder-side neural network (DSNN) based at least on the decompressed weight-update signal; means for decompressing the bitstream and/or for post-processing the decompressed bitstream to generate a representation of an output media, based at least on the adapted decoder-side neural network.

According to a third aspect, there is provided a method for encoding, comprising: receiving a representation of input media to be encoded; encoding the representation to generate encoded bitstreams to be delivered to a decoder, and using encoder's decoder-side neural network (en-DSNN) for decoding the encoded representation and/or post-processing the decoded representation; adapting the en-DSNN based at least on the representation or a signal derived from the representation and on an output of the en-DSNN or a signal derived from an output of the en-DSNN, thus obtaining a weight-update as a result; performing one or more iterations of compressing and decompressing the weight-update by using a weight-update codec; selecting values of one or more configuration parameters of the weight-update codec and using the selected values for a final compression of the weight-update; and signaling the compressed weight update to a decoder.

According to a fourth aspect, there is provided a method for decoding, comprising: receiving an encoded bitstream; obtaining a compressed weight-update signal; decompressing the compressed weight-update signal; adapting a decoder-side neural network (DSNN) based at least on the decompressed weight-update signal; decompressing the bitstream and/or post-processing the decompressed bitstream to generate a representation of an output media, based at least on the adapted DSNN.

According to a fifth aspect, there is provided an apparatus comprising at least one processor, memory including computer program code, the memory and the computer program code configured to, with the at least one processor, cause the apparatus to perform at least the following: receive a representation of input media to be encoded; encode the representation to generate encoded bitstreams to be delivered to a decoder, and use encoder's decoder-side neural network (en-DSNN) for decoding the encoded representation and/or post-processing the decoded representation; adapt the en-DSNN based at least on the representation or a signal derived from the representation and on an output of the en-DSNN or a signal derived from an output of the en-DSNN, thus obtaining a weight-update as a result; perform one or more iterations of compressing and decompressing the weight-update by using a weight-update codec; select values of one or more configuration parameters of the weight-update codec and use the selected values for a final compression of the weight-update; and signal the compressed weight update to a decoder.

According to a sixth aspect, there is provided an apparatus comprising at least one processor, memory including computer program code, the memory and the computer program code configured to, with the at least one processor, cause the apparatus to perform at least the following: receive an encoded bitstream; obtain a compressed weight-update signal; decompress the compressed weight-update signal; adapt a decoder-side neural network (DSNN) based at least on the decompressed weight-update signal; decompress the bit-stream and/or post-process the decompressed bitstream to generate a representation of an output media, based at least on the adapted DSNN.

According to a seventh aspect, there is provided computer program product comprising computer program code configured to, when executed on at least one processor, cause an apparatus or a system to: receive a representation of input media to be encoded; encode the representation to generate encoded bitstreams to be delivered to a decoder, and use encoder's decoder-side neural network (en-DSNN) for decoding the encoded representation and/or post-processing the decoded representation; adapt the en-DSNN based at least on the representation or a signal derived from the representation and on an output of the en-DSNN or a signal derived from an output of the en-DSNN, thus obtaining a weight-update as a result; perform one or more iterations of compressing and decompressing the weight-update by using a weight-update codec; select values of one or more configuration parameters of the weight-update codec and use the selected values for a final compression of the weight-update; and signal the compressed weight update to a decoder.

According to an eighth aspect, there is provided computer program product comprising computer program code configured to, when executed on at least one processor, cause an apparatus or a system to: receive an encoded bitstream; obtain a compressed weight-update signal; decompress the compressed weight-update signal; adapt a decoder-side neural network (DSNN) based at least on the decompressed weight-update signal; decompress the bitstream and/or post-process the decompressed bitstream to generate a representation of an output media, based at least on the adapted DSNN.

According to an embodiment, during encoding, each iteration comprises compressing and/or decompressing the weight-update based at least on tested values for one or more configuration parameters of a weight-update codec; using the decompressed weight-update for updating the en-DSNN; using the updated en-DSNN for decoding the encoded representation and/or for post-processing the decoded representation obtaining a reconstructed or processed representation; computing a quality of the reconstructed or processed representation based at least on a quality metric computed based at least on the reconstructed or processed representation and on a ground-truth representation; computing a score measuring rate-distortion performance for each of the tested values of one or more configuration parameters of the weight-update codec; wherein values to be selected from one or more configuration parameters of the weight-update codec are the values that yield the highest score.

According to an embodiment, the score is derived based on at least one of the following:

weight-update reconstruction quality;

difference between bitrates incurred when weight-update is not used and not signaled to the decoder compared to when weight-update is used and signaled to the decoder, at same or substantially same reconstructed or processed representation quality;

difference between a reconstructed or processed representation quality incurred when weight-update is used and signaled to the decoder compared to when weight-update is not used and not signaled to the decoder, at same or substantially same bitrate;

computed slope or an approximation of a slope of a line segment passing through a first rate-quality point representing the case when weight-update is used and signaled to the decoder and a second rate-quality point representing the case when weight-update is not used and is not signaled to the decoder;

value of a rate-distortion Lagrangian function;

spatial, temporal or spatiotemporal portion of the reconstructed representation.

According to an embodiment, the computer program product is embodied on a non-transitory computer readable medium.

DESCRIPTION OF THE DRAWINGS

In the following, various embodiments will be described in more detail with reference to the appended drawings, in which

FIG. 12 is a flowchart illustrating a method for encoding according to an embodiment;

FIG. 13 is a flowchart illustrating a method for decoding according to an embodiment.

DESCRIPTION OF EXAMPLE EMBODIMENTS

Figure 1:
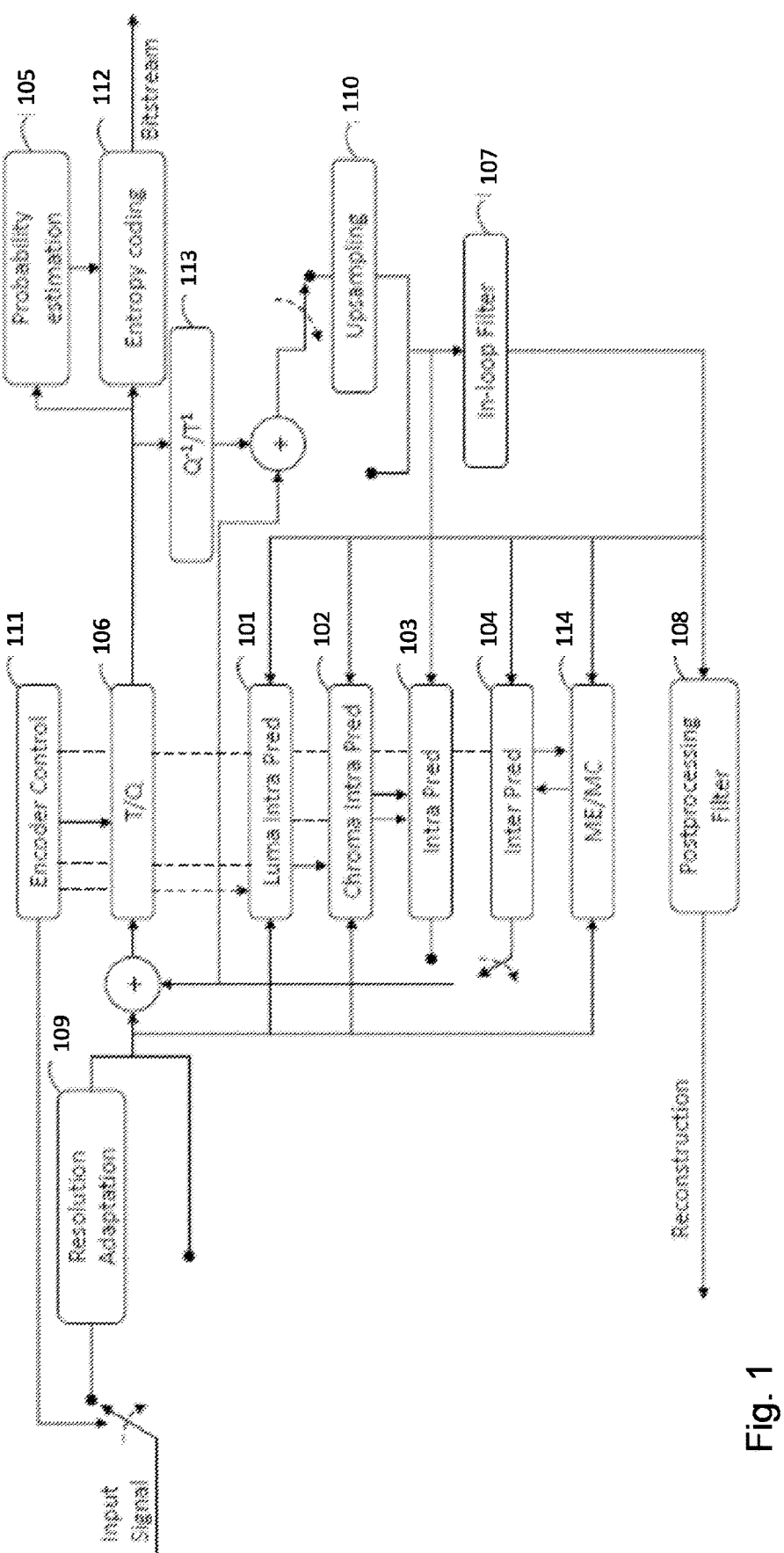
FIG. 1 shows an example of a codec with neural network (NN) components.

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment is included in at least one embodiment of the disclosure.

The present embodiments relate to adaptive probability model for video coding.

Before discussing the present embodiments in more detailed manner, a short reference to related technology is given.

A neural network (NN) is a computation graph consisting of several layers of computation. Each layer consists of one or more units, where each unit performs an elementary computation. A unit is connected to one or more other units, and the connection may have associated with a weight. The weight may be used for scaling the signal passing through the associated connection. Weights are learnable parameters, i.e., values which can be learned from training data. There may be other learnable parameters, such as those of batch-normalization layers.

Two widely used architectures for neural networks are feed-forward and recurrent architectures. Feed-forward neural networks are such that there is no feedback loop: each layer takes input from one or more of the layers before and provides its output as the input for one or more of the subsequent layers. Also, units inside a certain layer take input from units in one or more of preceding layers and provide output to one or more of following layers.

Initial layers (those close to the input data) extract semantically low-level features such as edges and textures in images, and intermediate and final layers extract more high-level features. After the feature extraction layers there may be one or more layers performing a certain task, such as classification, semantic segmentation, object detection, denoising, style transfer, super-resolution, etc. In recurrent neural nets, there is a feedback loop, so that the network becomes stateful, i.e., it is able to memorize information or a state.

Neural networks are being utilized in an ever-increasing number of applications for many different types of devices, such as mobile phones. Examples include image and video analysis and processing, social media data analysis, device usage data analysis, etc.

One of the important properties of neural networks (and other machine learning tools) is that they are able to learn properties from input data, either in supervised way or in unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output's error, also referred to as the loss. Examples of losses are mean squared error, cross-entropy, etc. In recent deep learning techniques, training is an iterative process, where at each iteration the algorithm modifies the weights of the neural net to make a gradual improvement of the network's output, i.e., to gradually decrease the loss.

In this description, terms "model" and "neural network" are used interchangeably, and also the weights of neural networks are sometimes referred to as learnable parameters or simply as parameters.

Training a neural network is an optimization process. The goal of the optimization or training process is to make the model learn the properties of the data distribution from a limited training dataset. In other words, the goal is to learn to use a limited training dataset in order to learn to generalize to previously unseen data, i.e., data which was not used for training the model. This is usually referred to as generalization. In practice, data may be split into at least two sets, the training set and the validation set. The training set is used for training the network, i.e., to modify its learnable parameters in order to minimize the loss. The validation set is used for checking the performance of the network on data, which was not used to minimize the loss, as an indication of the final performance of the model. In particular, the errors on the training set and on the validation set are monitored during the training process to understand the following things:

If the network is learning at all—in this case, the training set error should decrease, otherwise the model is in the regime of underfitting.

If the network is learning to generalize—in this case, also the validation set error needs to decrease and to be not too much higher than the training set error. If the training set error is low, but the validation set error is much higher than the training set error, or it does not decrease, or it even increases, the model is in the regime of overfitting. This means that the model has just memorized the training set's properties and performs well only on that set but performs poorly on a set not used for tuning its parameters.

Lately, neural networks have been used for compressing and de-compressing data such as images, i.e., in an image codec. The most widely used architecture for realizing one component of an image codec is the auto-encoder, which is a neural network consisting of two parts: a neural encoder and a neural decoder. The neural encoder takes as input an image and produces a code which requires less bits than the input image. This code may be obtained by applying a binarization or quantization process to the output of the encoder. The neural decoder takes in this code and reconstructs the image which was input to the neural encoder.

Such neural encoder and neural decoder may be trained to minimize a combination of bitrate and distortion, where the distortion may be based on one or more of the following metrics: Mean Squared Error (MSE), Peak Signal-to-Noise Ratio (PSNR), Structural Similarity Index Measure (SSIM), or similar. These distortion metrics are meant to be correlated to the human visual perception quality, so that minimizing or maximizing one or more of these distortion metrics results into improving the visual quality of the decoded image as perceived by humans.

Video codec comprises an encoder that transforms the input video into a compressed representation suited for storage/transmission and a decoder that can decompress the compressed video representation back into a viewable form. An encoder may discard some information in the original video sequence in order to represent the video in a more compact form (that is, at lower bitrate).

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). Extensions of the H.264/AVC include Scalable Video Coding (SVC) and Multiview Video Coding (MVC).

The High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range, three-dimensional, and screen content coding extensions which may be abbreviated SHVC, MV-HEVC, REXT, 3D-HEVC, and SCC, respectively.

Versatile Video Coding (H.266 a.k.a. VVC), defined in ITU-T Recommendation H.266 and equivalently in ISO/IEC 23090-3, (also referred to as MPEG-I Part 3) is a video compression standard developed as the successor to HEVC. A reference software for VVC is the VVC Test Model (VTM).

A specification of the AV1 bitstream format and decoding process were developed by the Alliance of Open Media (AOM). The AV1 specification was published in 2018. AOM is reportedly working on the AV2 specification.

An elementary unit for the input to a video encoder and the output of a video decoder, respectively, in most cases is a picture. A picture given as an input to an encoder may also be referred to as a source picture, and a picture decoded by a decoder may be referred to as a decoded picture or a reconstructed picture.

The source and decoded pictures are each comprises of one or more sample arrays, such as one of the following sets of sample arrays:

Luma (Y) only (monochrome),
Luma and two chroma (YCbCr or YCgCo),
Green, Blue and Red (GBR, also known as RGB),
Arrays representing other unspecified monochrome or tri-stimulus color samplings (for example, YZX, also known as XYZ).

A component may be defined as an array or single sample from one of the three sample arrays (luma and two chroma) that compose a picture, or the array or a single sample of the array that compose a picture in monochrome format.

Hybrid video codecs, for example ITU-T H.263 and H.264, may encode the video information in two phases. Firstly, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e., the difference between the predicted block of pixels and the original block of pixels, is coded. This may be done by transforming the difference in pixel values using a specified transform (e.g., Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, exploits temporal redundancy. In inter prediction the sources of prediction are previously decoded pictures.

Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means, the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

In video codecs, the motion information may be indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently, those may be coded differentially with respect to block specific predicted motion vectors. In video codecs, the predicted motion vectors may be created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or or co-located blocks in temporal reference picture. Moreover, high efficiency video codecs can employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information may be carried out using the motion field information of adjacent blocks and/or co-located blocks in temporal reference pictures and the used motion field information is signaled among a list of motion field candidate list filled with motion field information of available adjacent/co-located blocks.

In video codecs the prediction residual after motion compensation may be first transformed with a transform kernel (like DCT) and then coded. The reason for this is that often there still exists some correlation among the residual and transform can in many cases help reduce this correlation and provide more efficient coding.

Video encoders may utilize Lagrangian cost functions to find optimal coding modes, e.g., the desired coding mode for a block, block partitioning, and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C = D + \lambda R$$

where C is the Lagrangian cost to be minimized, D is the image distortion (e.g., Mean Squared Error) with the mode and motion vectors considered, and R the number of bits needed to represent the required data to reconstruct the image block in the decoder (including the amount of data to represent the candidate motion vectors). The rate R may be the actual bitrate or bit count resulting from encoding. Alternatively, the rate R may be an estimated bitrate or bit count. One possible way of the estimating the rate R is to omit the final entropy encoding step and use e.g., a simpler entropy encoding or an entropy encoder where some of the context states have not been updated according to previously encoding mode selections.

Conventionally used distortion metrics may comprise, but are not limited to, peak signal-to-noise ratio (PSNR), mean squared error (MSE), sum of absolute differences (SAD), sub of absolute transformed differences (SATD), and structural similarity (SSIM), typically measured between the reconstructed video/image signal (that is or would be identical to the decoded video/image signal) and the "original" video/image signal provided as input for encoding.

A partitioning may be defined as a division of a set into subsets such that each element of the set is in exactly one of the subsets.

A bitstream may be defined as a sequence of bits, which may in some coding formats or standards be in the form of a network abstraction layer (NAL) unit stream or a byte stream, that forms the representation of coded pictures and associated data forming one or more coded video sequences.

A bitstream format may comprise a sequence of syntax structures.

A syntax element may be defined as an element of data represented in the bitstream. A syntax structure may be defined as zero or more syntax elements present together in the bitstream in a specified order.

A NAL unit may be defined as a syntax structure containing an indication of the type of data to follow and bytes containing that data in the form of an RBSP interspersed as necessary with start code emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

Some coding formats specify parameter sets that may carry parameter values needed for the decoding or reconstruction of decoded pictures. A parameter may be defined as a syntax element of a parameter set. A parameter set may be defined as a syntax structure that contains parameters and that can be referred to from or activated by another syntax structure for example using an identifier.

A coding standard or specification may specify several types of parameter sets. It needs to be understood that embodiments may be applied but are not limited to the described types of parameter sets and embodiments could likewise be applied to any parameter set type.

A parameter set may be activated when it is referenced e.g., through its identifier. An adaptation parameter set (APS) may be defined as a syntax structure that applies to zero or more slices. There may be different types of adaptation parameter sets. An adaptation parameter set may for example contain filtering parameters for a particular type of a filter. In VVC, three types of APSs are specified carrying parameters for one of: adaptive loop filter (ALF), luma mapping with chroma scaling (LMCS), and scaling lists. A scaling list may be defined as a list that associates each frequency index with a scale factor for the scaling process, which multiplies transform coefficient levels by a scaling factor, resulting in transform coefficients. In VVC, an APS is referenced through its type (e.g., ALF, LMCS, or scaling list) and an identifier. In other words, different types of APSs have their own identifier value ranges.

An Adaptation Parameter Set (APS) may comprise parameters for decoding processes of different types, such as adaptive loop filtering or luma mapping with chroma scaling.

Video coding specifications may enable the use of supplemental enhancement information (SEI) messages or alike. Some video coding specifications include SEI network abstraction layer (NAL) units, and some video coding specifications contain both prefix SEI NAL units and suffix SEI NAL units, where the former type can start a picture unit or alike and the latter type can end a picture unit or alike. An SEI NAL unit contains one or more SEI messages, which are not required for the decoding of output pictures but may assist in related processes, such as picture output timing, post-processing of decoded pictures, rendering, error detection, error concealment, and resource reservation. Several SEI messages are specified in H.264/AVC, H.265/HEVC, H.266/VVC, and H.274/VSEI standards, and the user data SEI messages enable organizations and companies to specify SEI messages for their own use. The standards may contain the syntax and semantics for the specified SEI messages but a process for handling the messages in the recipient might not be defined. Consequently, encoders may be required to follow the standard specifying a SEI message when they create SEI message(s), and decoders might not be required to process SEI messages for output order conformance. One of the reasons to include the syntax and semantics of SEI messages in standards is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified. SEI messages are generally not extended in future amendments or versions of the standard.

The phrase along the bitstream (e.g., indicating along the bitstream) or along a coded unit of a bitstream (e.g., indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

Image and video codecs may use a set of filters to enhance the visual quality of the predicted visual content and can be applied either in-loop or out-of-loop, or both. In the case of in-loop filters, the filter applied on one block in the currently-encoded frame will affect the encoding of another block in the same frame and/or in another frame which is predicted from the current frame. An in-loop filter can affect the bitrate and/or the visual quality. In fact, an enhanced block will cause a smaller residual (difference between original block and predicted-and-filtered block), thus requiring less bits to be encoded. An out-of-the loop filter will be applied on a frame after it has been reconstructed, the filtered visual content won't be as a source for prediction, and thus it may only impact the visual quality of the frames that are output by the decoder.

In-loop filters in a video/image encoder and decoder may comprise, but may not be limited to, one or more of the following:

deblocking filter (DBF);
    sample adaptive offset (SAO) filter;
    adaptive loop filter (ALF) for luma and/or chroma components;
    cross-component adaptive loop filter (CC-ALF).

A deblocking filter may be configured to reduce blocking artefacts due to block-based coding. A deblocking filter may be applied (only) to samples located at prediction unit (PU) and/or transform unit (TU) boundaries, except at the picture boundaries or when disabled at slice and/or tiles boundaries. Horizontal filtering may be applied (first) for vertical boundaries, and vertical filtering may be applied for horizontal boundaries.

A sample adaptive offset (SAO) may be another in-loop filtering process that modifies decoded samples by conditionally adding an offset value to a sample (possibly to each sample), based on values in look-up tables transmitted by the encoder. SAO may have one or more (e.g., two) operation modes; band offset and edge offset modes. In the band offset mode, an offset may be added to the sample value depending on the sample amplitude. The full sample amplitude range may be divided into a number of bands (e.g., 32 bands), and sample values belonging to four of these bands may be modified by adding a positive or negative offset, which may be signalled for each coding tree unit (CTU). In the edge offset mode, the horizontal, vertical, and two diagonal gradients may be used for classification.

An Adaptive Loop Filter (ALF) may apply block-based filter adaptation. For example, for the luma component, one among 25 filters may be selected for each 4×4 block, based on the direction and activity of local gradients, which are derived using the samples values of that 4×4 block. The ALF classification may be performed on 2×2 block units, for instance. When all of the vertical, horizontal and diagonal gradients are below a first threshold value, the block may be classified as texture (not containing edges). Otherwise, the block may be classified to contain edges, a dominant edge direction may be derived from horizontal, vertical and diagonal gradients, and a strength of the edge (e.g., strong or weak) may be further derived from the gradient values. When a filter within a filter set has been selected based on the classification, the filtering may be performed by applying a 7×7 diamond filter, for example, to the luma component. An ALF filter set may comprise one filter for each chroma component, and a 5×5 diamond filter may be applied to the chroma components, for example. In an example, the filter coefficients use point-symmetry relative to the center point. An ALF design may comprise clipping the difference between the neighboring sample value and the current to-be-filtered sample is added, which provides adaptability related to both spatial relationship and value similarity between samples.

In an example, cross-component ALF (CC-ALF) uses luma sample values to refine each chroma component by applying an adaptive linear filter to the luma channel and then using the output of this filtering operation for chroma refinement. Filtering in CC-ALF is accomplished by applying a linear, diamond shaped filter to the luma channel.

In an approach, ALF filter parameters are signalled in Adaptation Parameter Set (APS). For example, in one APS, up to 25 sets of luma filter coefficients and clipping value indices, and up to eight sets of chroma filter coefficients and clipping value indices could be signalled. To reduce the overhead, filter coefficients of different classification for luma component can be merged. In slice header, the identifiers of the APSs used for the current slice are signaled.

In VVC slice header, up to 7 ALF APS indices can be signaled to specify the luma filter sets that are used for the current slice. The filtering process can be further controlled at coding tree block (CTB) level. A flag is signalled to indicate whether ALF is applied to a luma CTB. A filter set among 16 fixed filter sets and the filter sets from APSs selected in the slice header may be selected per each luma CTB by the encoder and may be decoded per each luma CTB by the decoder. A filter set index is signaled for a luma CTB to indicate which filter set is applied. The 16 fixed filter sets are pre-defined in the VVC standard and hardcoded in both the encoder and the decoder. The 16 fixed filter sets may be referred to as the pre-defined ALFs.

A feature known as luma mapping with chroma scaling (LMCS) is included in H.266/VVC. The luma mapping (LM) part remaps luma sample values. It may be used to use a full luma sample value range (e.g., 0 to 1023, inclusive in bit depth equal to 10 bits per sample) in content that would otherwise occupy only a subset of the range.

The luma sample values of an input video signal to the encoder and output video signal from the decoder are represented in the original (unmapped) sample domain. Forward luma mapping maps luma sample values from the original sample domain to the mapped sample domain. Inverse luma mapping maps luma sample values from the mapped sample domain to the original sample domain.

In an example codec architecture, the processes in the mapped sample domain include inverse quantization, inverse transform, luma intra prediction and summing the luma prediction with the luma residue values. The processes in the original sample domain include in-loop filters (e.g., deblocking, SAO, ALF), inter prediction, and storage of pictures in the decoded picture buffer (DPB).

In an example decoder, one or more of the following steps may be performed:

Inverse quantization and inverse transform are applied to the decoded luma transform coefficients to produce the luma residues in the mapped sample domain, $Y'_{res}$;
    Reconstructed luma sample values in the mapped sample domain, $Y'r$, are obtained by summing $Y'_{res}$ with the corresponding predicted luma values in the mapped sample domain, $Y'_{pred}$.
    For intra prediction, $Y'_{pred}$ is directly obtained by performing intra prediction in mapped sample domain.
    For inter prediction, the predicted luma values in original sample domain, $Y_{pred}$, are first obtained by motion compensation using reference pictures from the DPB, and then forward luma mapping is applied to produce the luma values in the mapped sample domain, $Y'_{pred}$.
    Inverse luma mapping is applied to reconstructed values $Y'r$ to produce reconstructed luma sample values in the original sample domain, which are processed by in-loop filters (deblocking, sample adaptive offset, and adaptive loop filter) before being stored in the DPB.

In VVC, LMCS syntax elements are signalled in an adaptation parameter set (APS) with aps_params_type equal to 1 (LMCS_APS). The value range for an adaptation parameter set identifier (aps_adaptation_parameter_set_id) is from 0 to 3, inclusive, for LMCS APSs. The use of LMCS can be enabled or disabled in a picture header. When LMCS is enabled in a picture header, the LMCS APS identifier value used for the picture (ph_lmcs_aps_id) is included in the picture header. Thus, the same LMCS parameters are used for entire picture. Note also that when LMCS is enabled in a picture header and a chroma format including the chroma components is in use, the chroma scaling part can be enabled or disabled in the picture header through ph_chroma_residual_scale_flag. When a picture has multiple slices, LMCS is further enabled or disabled in the slice header for each slice.

In VVC, LMCS data within an LMCS APS comprises syntax related to a piecewise linear model of up to 16 pieces for luma mapping. The luma sample value range of the piecewise linear forward mapping function is uniformly sampled into 16 pieces of same length OrgCW. For example, for a 10-bit input video, each of the 16 pieces contains OrgCW=64 input codewords. For each piece of index i, the number of output (mapped) codewords is defined as binCW [i]. binCW[i] is determined at the encoding process. The difference between binCW[i] and OrgCW is signalled in LMCS APS. The slopes scaleY[i] and invScaleY[i] of the functions FwdMap and InvMap are respectively derived as:

$$scaleY[i] = binCW[i] \div OrgCW$$

$$invScaleY[i] = OrgCW \div binCW[i]$$

Recently, neural networks (NNs) have been used in the context of image and video compression, by following mainly two approaches.

In one approach, NNs are used to replace one or more of the components of a traditional codec such as VVC/H.266. Here, term "traditional" refers to those codecs whose components and their parameters may not be learned from data. Examples of such components are:

Additional in-loop filter, for example by having the NN as an additional in-loop filter with respect to the traditional loop filters.

Single in-loop filter, for example by having the NN replacing all traditional in-loop filters.

Intra-frame prediction.

Inter-frame prediction.

Transform and/or inverse transform.

Probability model for the arithmetic codec.

Etc.

FIG. 1 illustrates examples of functioning of NNs as components of a traditional codec's pipeline, in accordance with an embodiment. In particular, FIG. 1 illustrates an encoder, which also includes a decoding loop. FIG. 1 is shown to include components described below:

A luma intra pred block or circuit 101. This block or circuit performs intra prediction in the luma domain, for example, by using already reconstructed data from the same frame. The operation of the luma intra pred block or circuit 101 may be performed by a deep neural network such as a convolutional auto-encoder.

A chroma intra pred block or circuit 102. This block or circuit performs intra prediction in the chroma domain, for example, by using already reconstructed data from the same frame. The chroma intra pred block or circuit 102 may perform cross-component prediction, for example, predicting chroma from luma. The operation of the chroma intra pred block or circuit 102 may be performed by a deep neural network such as a convolutional auto-encoder.

An intra pred block or circuit 103 and inter-pred block or circuit 104. These blocks or circuit perform intra prediction and inter-prediction, respectively. The intra pred block or circuit 103 and the inter-pred block or circuit 104 may perform the prediction on all components, for example, luma and chroma. The operations of the intra pred block or circuit 103 and inter-pred block or circuit 104 may be performed by two or more deep neural networks such as convolutional auto-encoders.

A probability estimation block or circuit 105 for entropy coding. This block or circuit performs prediction of probability for the next symbol to encode or decode, which is then provided to the entropy coding module 112, such as the arithmetic coding module, to encode or decode the next symbol. The operation of the probability estimation block or circuit 105 may be performed by a neural network.

A transform and quantization (T/Q) block or circuit 106. These are actually two blocks or circuits. The transform and quantization block or circuit 106 may perform a transform of input data to a different domain, for example, the FFT transform would transform the data to frequency domain. The transform and quantization block or circuit 106 may quantize its input values to a smaller set of possible values. In the decoding loop, there may be inverse quantization block or circuit and inverse transform block or circuit 113. One or both of the transform block or circuit and quantization block or circuit may be replaced by one or two or more neural networks. One or both of the inverse transform block or circuit and inverse quantization block or circuit 113 may be replaced by one or two or more neural networks.

An in-loop filter block or circuit 107. Operations of the in-loop filter block or circuit 107 is performed in the decoding loop, and it performs filtering on the output of the inverse transform block or circuit, or anyway on the reconstructed data, in order to enhance the reconstructed data with respect to one or more predetermined quality metrics. This filter may affect both the quality of the decoded data and the bitrate of the bitstream output by the encoder. The operation of the in-loop filter block or circuit 107 may be performed by a neural network, such as a convolutional auto-encoder. In examples, the operation of the in-loop filter may be performed by multiple steps or filters, where the one or more steps may be performed by neural networks.

A postprocessing filter block or circuit 108. The postprocessing filter block or circuit 108 may be performed only at decoder side, as it may not affect the encoding process. The postprocessing filter block or circuit 108 filters the reconstructed data output by the in-loop filter block or circuit 107, in order to enhance the reconstructed data. The postprocessing filter block or circuit 108 may be replaced by a neural network, such as a convolutional auto-encoder.

A resolution adaptation block or circuit 109: this block or circuit may downsample the input video frames, prior to encoding. Then, in the decoding loop, the reconstructed data may be upsampled, by the upsampling block or circuit 110, to the original resolution. The operation of the resolution adaptation block or circuit 109 block or circuit may be performed by a neural network such as a convolutional auto-encoder.

An encoder control block or circuit 111. This block or circuit performs optimization of encoder's parameters, such as what transform to use, what quantization parameters (QP) to use, what intra-prediction mode (out of N intra-prediction modes) to use, and the like. The operation of the encoder control block or circuit 111 may be performed by a neural network, such as a classifier convolutional network, or such as a regression convolutional network.

An ME/MC block or circuit 114 performs motion estimation and/or motion compensation, which are two key operations to be performed when performing inter-frame prediction. ME/MC stands for motion estimation/motion compensation.

Figure 2:
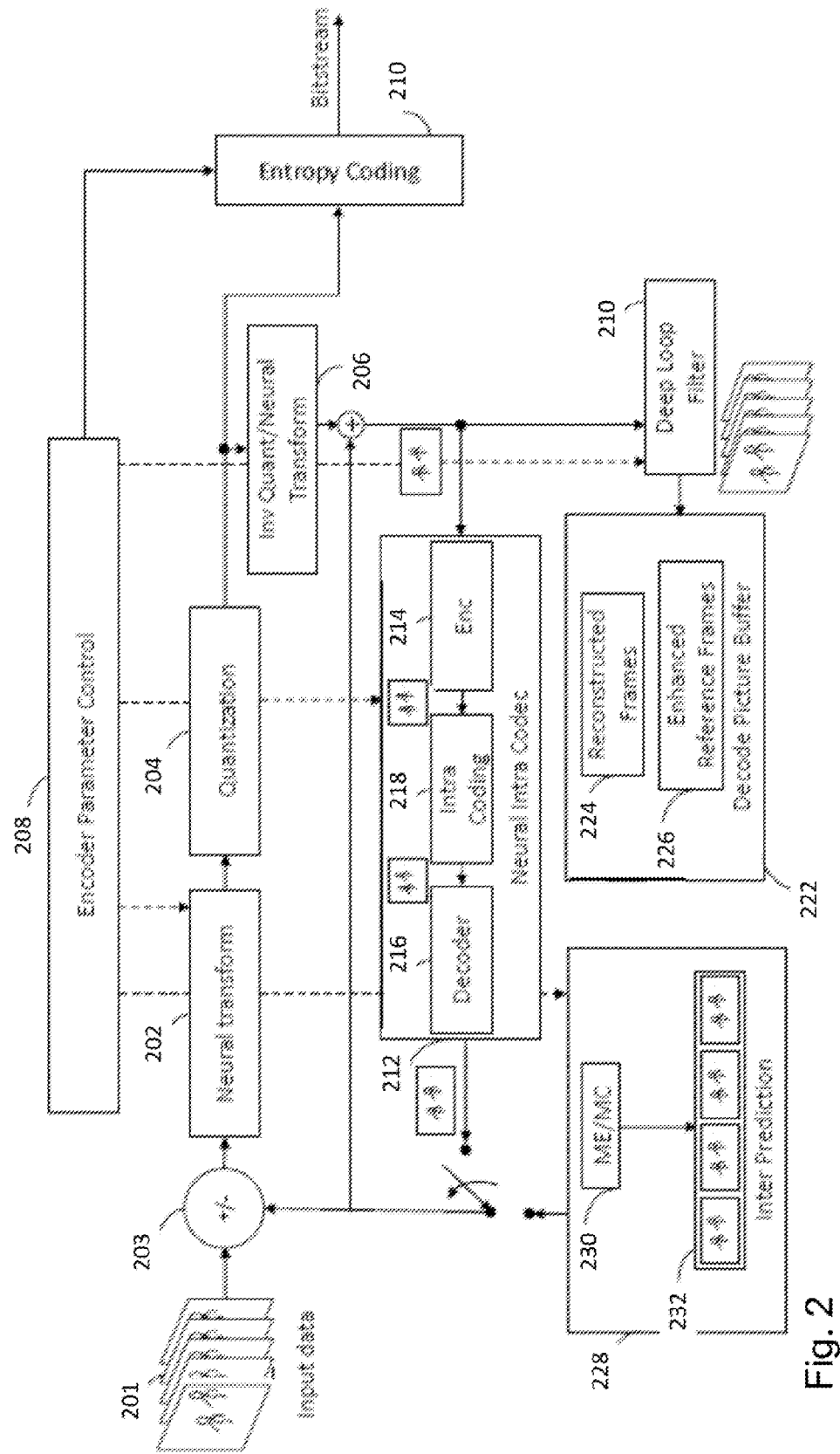
FIG. 2 shows another example of a video coding system with neural network components.

In another approach, commonly referred to as "end-to-end learned compression", NNs are used as the main components of the image/video codecs. In this second approach, there are two main options:

Option 1: re-use the video coding pipeline but replace most or all the components with NNs. Referring to FIG. 2, it illustrates an example of modified video coding pipeline based on a neural network, in accordance with an embodiment. An example of neural network may include, but is not limited to, a compressed representation of a neural network. FIG. 2 is shown to include following components:

A neural transform block or circuit 202: this block or circuit transforms the output of a summation/subtraction operation 203 to a new representation of that data, which may have lower entropy and thus be more compressible.

A quantization block or circuit 204: this block or circuit quantizes an input data 201 to a smaller set of possible values.

An inverse transform and inverse quantization blocks or circuits 206. These blocks or circuits perform the inverse or approximately inverse operation of the transform and the quantization, respectively.

An encoder parameter control block or circuit 208. This block or circuit may control and optimize some or all the parameters of the encoding process, such as parameters of one or more of the encoding blocks or circuits.

An entropy coding block or circuit 210. This block or circuit may perform lossless coding, for example based on entropy. One popular entropy coding technique is arithmetic coding.

A neural intra-codec block or circuit 212. This block or circuit may be an image compression and decompression block or circuit, which may be used to encode and decode an intra frame. An encoder 214 may be an encoder block or circuit, such as the neural encoder part of an auto-encoder neural network. A decoder 216 may be a decoder block or circuit, such as the neural decoder part of an auto-encoder neural network. An intra-coding block or circuit 218 may be a block or circuit performing some intermediate steps between encoder and decoder, such as quantization, entropy encoding, entropy decoding, and/or inverse quantization.

A deep loop filter block or circuit 220. This block or circuit performs filtering of reconstructed data, in order to enhance it.

A decode picture buffer block or circuit 222. This block or circuit is a memory buffer, keeping the decoded frame, for example, reconstructed frames 224 and enhanced reference frames 226 to be used for inter prediction.

An inter-prediction block or circuit 228. This block or circuit performs inter-frame prediction, for example, predicts from frames, for example, frames 232, which are temporally nearby. An ME/MC 230 performs motion estimation and/or motion compensation, which are two key operations to be performed when performing inter-frame prediction. ME/MC stands for motion estimation/motion compensation.

Option 2: re-design the whole pipeline, as follows.

Encoder NN is configured to perform a non-linear transform;

Quantization and lossless encoding of the encoder NN's output;

Lossless decoding and dequantization;

Decoder NN is configured to perform a non-linear inverse transform.

Figure 3:
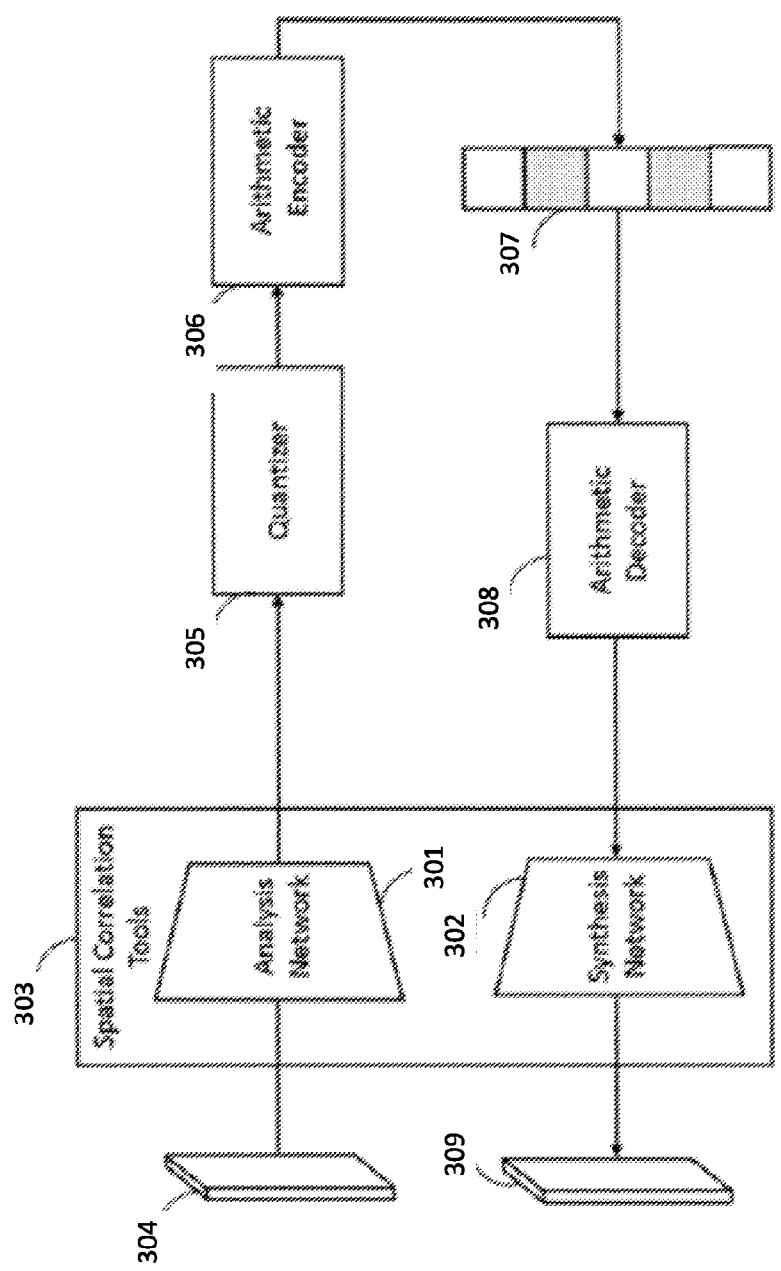
FIG. 3 shows an example of a neural network-based end-to-end learned codec.

An example of option 2 is described in detail in FIG. 3 which shows an encoder NN and a decoder NN being parts of a neural auto-encoder architecture, in accordance with an example. In FIG. 3, the Analysis Network 301 is an Encoder NN, and the Synthesis Network 302 is the Decoder NN, which may together be referred to as spatial correlation tools 303, or as neural auto-encoder.

As shown in FIG. 3, the input data 304 is analyzed by the Encoder NN (Analysis Network 301), which outputs a new representation of that input data. The new representation may be more compressible. This new representation may then be quantized, by a quantizer 305, to a discrete number of values. The quantized data is then lossless encoded, for example by an arithmetic encoder 306, thus obtaining a bitstream 307. The example shown in FIG. 3 includes an arithmetic decoder 308 and an arithmetic encoder 306. The arithmetic encoder 306, or the arithmetic decoder 308, or the combination of the arithmetic encoder 306 and arithmetic decoder 308 may be referred to as arithmetic codec in some embodiments. On the decoding side, the bitstream is first lossless decoded, for example, by using the arithmetic codec decoder 308. The lossless decoded data is dequantized and then input to the Decoder NN, Synthesis Network 302. The output is the reconstructed or decoded data 309.

In case of lossy compression, the lossy steps may comprise the Encoder NN and/or the quantization.

In order to train this system, a training objective function (also called "training loss") may be utilized, which may comprise one or more terms, or loss terms, or simply losses. In one example, the training loss comprises a reconstruction loss term and a rate loss term. The reconstruction loss encourages the system to decode data that is similar to the input data, according to some similarity metric. Examples of reconstruction losses are:

Mean squared error (MSE);

Multi-scale structural similarity (MS-SSIM);

Losses derived from the use of a pretrained neural network. For example, error (f1, f2), where f1 and f2 are the features extracted by a pretrained neural network for the input data and the decoded data, respectively, and error ( ) is an error or distance function, such as L1 norm or L2 norm;

Losses derived from the use of a neural network that is trained simultaneously with the end-to-end learned codec. For example, adversarial loss can be used, which is the loss provided by a discriminator neural network that is trained adversarially with respect to the codec, following the settings proposed in the context of Generative Adversarial Networks (GANs) and their variants.

The rate loss encourages the system to compress the output of the encoding stage, such as the output of the arithmetic encoder. By "compressing", we mean reducing the number of bits output by the encoding stage.

When an entropy-based lossless encoder is used, such as an arithmetic encoder, the rate loss typically encourages the output of the Encoder NN to have low entropy. Example of rate losses are the following:

A differentiable estimate of the entropy;

A sparsification loss, i.e., a loss that encourages the output of the Encoder NN or the output of the quantization to have many zeros. Examples are L0 norm, L1 norm, L1 norm divided by L2 norm;

A cross-entropy loss applied to the output of a probability model, where the probability model may be a NN used to estimate the probability of the next symbol to be encoded by an arithmetic encoder.

One or more of reconstruction losses may be used, and one or more of the rate losses may be used, as a weighted sum. The different loss terms may be weighted using different weights, and these weights determine how the final system performs in terms of rate-distortion loss. For example, if more weight is given to the reconstruction losses with respect to the rate losses, the system may learn to compress less but to reconstruct with higher accuracy (as measured by a metric that correlates with the reconstruction losses). These weights may be considered to be hyper-parameters of the training session and may be set manually by the person designing the training session, or automatically for example by grid search or by using additional neural networks.

Figure 4:
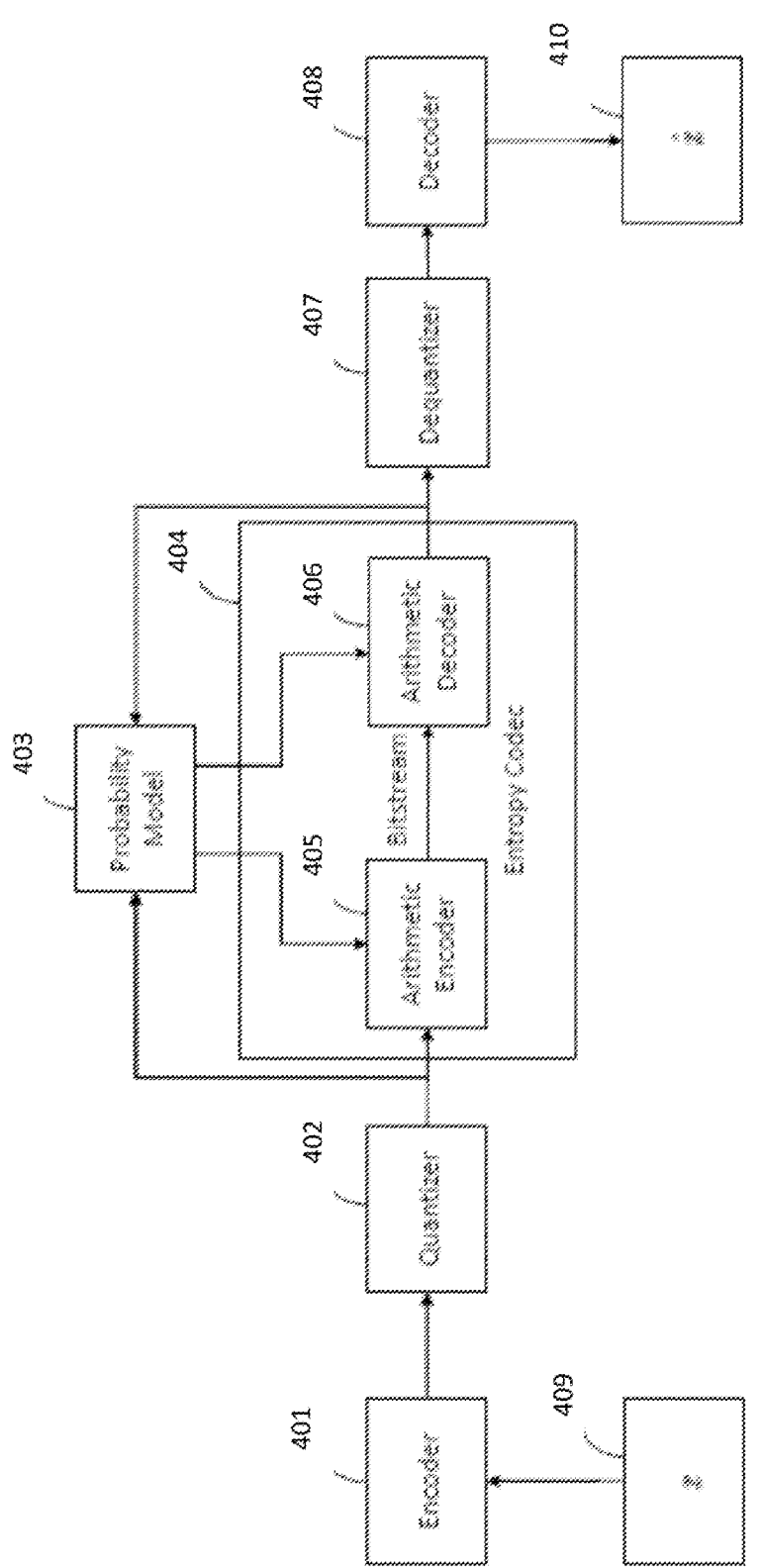
FIG. 4 shows an example of a neural network-based end-to-end learned video coding system.

As shown in FIG. 4, a neural network-based end-to-end learned video coding system may contain an encoder 401, a quantizer 402, a probability model 403, an entropy codec 420 (for example arithmetic encoder 405/arithmetic decoder 406), a dequantizer 407, and a decoder 408. The encoder 401 and decoder 408 may be two neural networks, or mainly comprise neural network components. The probability model 403 may also comprise mainly neural network components. Quantizer 402, dequantizer 407 and entropy codec 420 may not be based on neural network components, but they may also comprise neural network components, potentially.

On the encoder side, the encoder component 401 takes a video x 409 as input and converts the video from its original signal space into a latent representation that may comprise a more compressible representation of the input. In the case of an input image, the latent representation may be a 3-dimensional tensor, where two dimensions represent the vertical and horizontal spatial dimensions, and the third dimension represent the "channels" which contain information at that specific location. If the input image is a 128× 128×3 RGB image (with horizontal size of 128 pixels, vertical size of 128 pixels, and 3 channels for the Red, Green, Blue color components), and if the encoder down-samples the input tensor by 2 and expands the channel dimension to 32 channels, then the latent representation is a tensor of dimensions (or "shape") 64×64×32 (i.e., with horizontal size of 64 elements, vertical size of 64 elements, and 32 channels). Please note that the order of the different dimensions may differ depending on the convention which is used; in some cases, for the input image, the channel dimension may be the first dimension, so for the above example, the shape of the input tensor may be represented as 3×128×128, instead of 128×128×3. In the case of an input video (instead of just an input image), another dimension in the input tensor may be used to represent temporal information.

The quantizer component 402 quantizes the latent representation into discrete values given a predefined set of quantization levels. Probability model 403 and arithmetic codec component 420 work together to perform lossless compression for the quantized latent representation and generate bitstreams to be sent to the decoder side. Given a symbol to be encoded into the bitstream, the probability model 403 estimates the probability distribution of all possible values for that symbol based on a context that is constructed from available information at the current encoding/decoding state, such as the data that has already been encoded/decoded. Then, the arithmetic encoder 405 encodes the input symbols to bitstream using the estimated probability distributions.

On the decoder side, opposite operations are performed. The arithmetic decoder 406 and the probability model 403 first decode symbols from the bitstream to recover the quantized latent representation. Then the dequantizer 407 reconstructs the latent representation in continuous values and pass it to decoder 408 to recover the input video/image. Note that the probability model 403 in this system is shared between the encoding and decoding systems. In practice, this means that a copy of the probability model 403 is used at encoder side, and another exact copy is used at decoder side.

In this system, the encoder 401, probability model 403, and decoder 408 may be based on deep neural networks. The system may be trained in an end-to-end manner by minimizing the following rate-distortion loss function:

$$L = D + \lambda R,$$

where D is the distortion loss term, R is the rate loss term, and λ is the weight that controls the balance between the two losses. The distortion loss term may be the mean square error (MSE), structure similarity (SSIM) or other metrics that evaluate the quality of the reconstructed video. Multiple distortion losses may be used and integrated into D, such as a weighted sum of MSE and SSIM. The rate loss term is normally the estimated entropy of the quantized latent representation, which indicates the number of bits necessary to represent the encoded symbols, for example, bits-per-pixel (bpp).

For lossless video/image compression, the system may contain only the probability model 403 and arithmetic encoder/decoder 405, 406. The system loss function contains only the rate loss, since the distortion loss is always zero (i.e., no loss of information).

Reducing the distortion in image and video compression is often intended to increase human perceptual quality, as humans are considered to be the end users, i.e., consuming/watching the decoded image. Recently, with the advent of machine learning, especially deep learning, there is a rising number of machines (i.e., autonomous agents) that analyze data independently from humans and that may even take decisions based on the analysis results without human intervention. Examples of such analysis are object detection, scene classification, semantic segmentation, video event detection, anomaly detection, pedestrian tracking, etc. Example use cases and applications are self-driving cars, video surveillance cameras and public safety, smart sensor networks, smart TV and smart advertisement, person reidentification, smart traffic monitoring, drones, etc. When the decoded data is consumed by machines, a different quality metric shall be used instead of human perceptual quality. Also, dedicated algorithms for compressing and decompressing data for machine consumption are likely to be different than those for compressing and decompressing data for human consumption. The set of tools and concepts for compressing and decompressing data for machine consumption is referred to here as Video Coding for Machines (VCM).

VCM concerns the encoding of video streams to allow consumption for machines. Machine is referred to indicate any device except human. Example of machine can be a mobile phone, an autonomous vehicle, a robot, and such intelligent devices which may have a degree of autonomy or run an intelligent algorithm to process the decoded stream beyond reconstructing the original input stream.

A machine may perform one or multiple tasks on the decoded stream. Examples of tasks can comprise the following:

Classification: classify an image or video into one or more predefined categories. The output of a classification task may be a set of detected categories, also known as classes or labels. The output may also include the probability and confidence of each predefined category.

Object detection: detect one or more objects in a given image or video. The output of an object detection task may be the bounding boxes and the associated classes of the detected objects. The output may also include the probability and confidence of each detected object.

Instance segmentation: identify one or more objects in an image or video at the pixel level. The output of an instance segmentation task may be binary mask images or other representations of the binary mask images, e.g., closed contours, of the detected objects. The output may also include the probability and confidence of each object for each pixel.

Semantic segmentation: assign the pixels in an image or video to one or more predefined semantic categories. The output of a semantic segmentation task may be binary mask images or other representations of the binary mask images, e.g., closed contours, of the assigned categories. The output may also include the probability and confidence of each semantic category for each pixel.

Object tracking: track one or more objects in a video sequence. The output of an object tracking task may include frame index, object ID, object bounding boxes, probability, and confidence for each tracked object.

Captioning: generate one or more short text descriptions for an input image or video. The output of the captioning task may be one or more short text sequences.

Human pose estimation: estimate the position of the key points, e.g., wrist, elbows, knees, etc., from one or more human bodies in an image of the video. The output of a human pose estimation includes sets of locations of each key point of a human body detected in the input image or video.

Human action recognition: recognize the actions, e.g., walking, talking, shaking hands, of one or more people in an input image or video. The output of the human action recognition may be a set of predefined actions, probability, and confidence of each identified action.

Anomaly detection: detect abnormal object or event from an input image or video. The output of an anomaly detection may include the locations of detected abnormal objects or segments of frames where abnormal events detected in the input video.

It is likely that the receiver-side device has multiple "machines" or task neural networks (Task-NNs). These multiple machines may be used in a certain combination which is for example determined by an orchestrator subsystem. The multiple machines may be used for example in succession, based on the output of the previously used machine, and/or in parallel. For example, a video which was compressed and then decompressed may be analyzed by one machine (NN) for detecting pedestrians, by another machine (another NN) for detecting cars, and by another machine (another NN) for estimating the depth of all the pixels in the frames.

In this description, "task machine" and "machine" and "task neural network" are referred to interchangeably, and for such referral any process or algorithm (learned or not from data) which analyzes or processes data for a certain task is meant. In the rest of the description, other assumptions made regarding the machines considered in this disclosure may be specified in further details. Also, term "receiver-side" or "decoder-side" are used to refer to the physical or abstract entity or device, which contains one or more machines, and runs these one or more machines on an encoded and eventually decoded video representation which is encoded by another physical or abstract entity or device, the "encoder-side device".

The encoded video data may be stored into a memory device, for example as a file. The stored file may later be provided to another device. Alternatively, the encoded video data may be streamed from one device to another.

Figure 5:
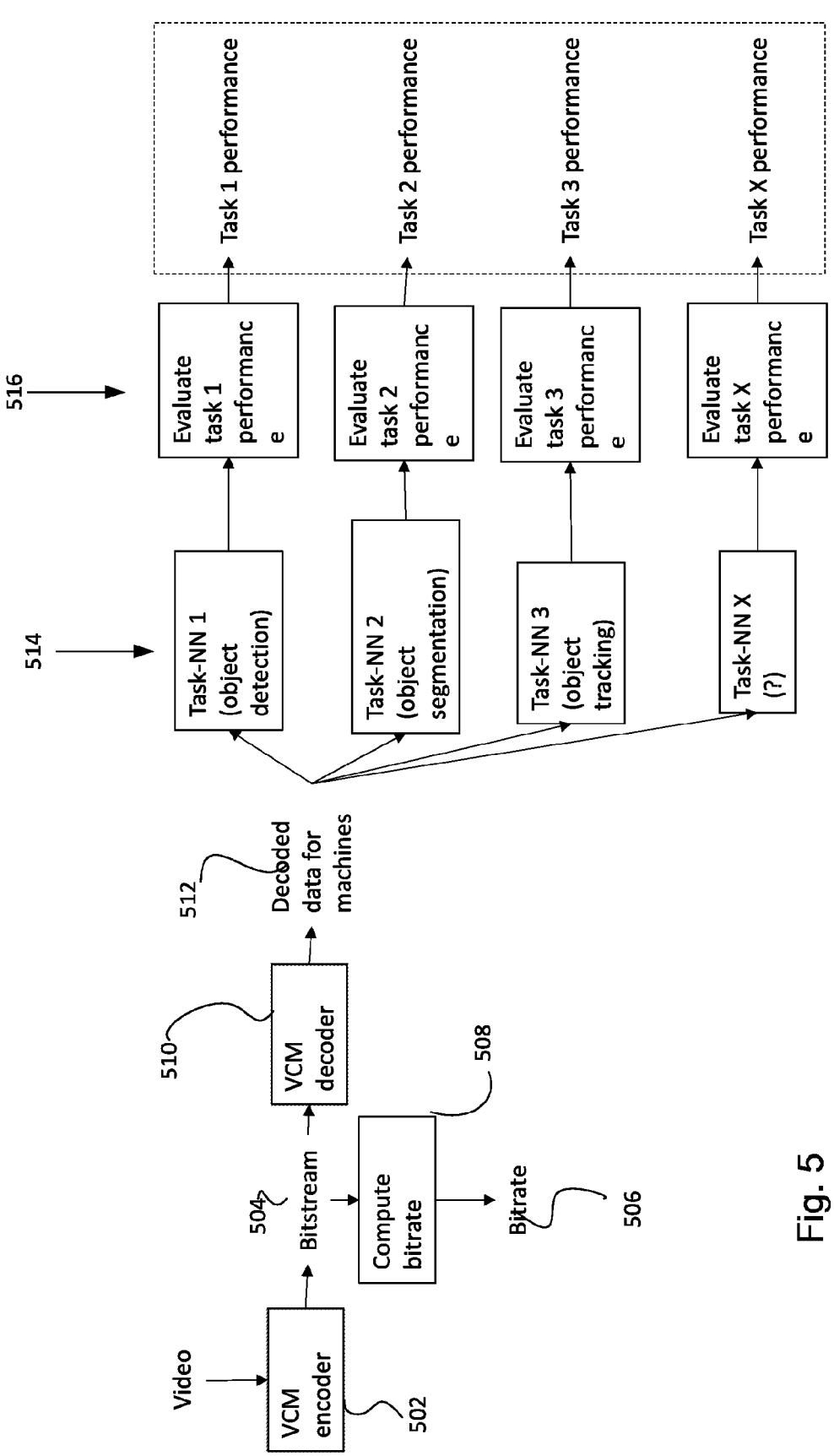
FIG. 5 shows an example of a video coding for machines.

FIG. 5 is a general illustration of the pipeline of Video Coding for Machines. A VCM encoder 502 encodes the input video into a bitstream 504. A bitrate 506 may be computed 508 from the bitstream 504 in order to evaluate the size of the bitstream. A VCM decoder 510 decodes the bitstream output by the VCM encoder 502. In FIG. 5, the output of the VCM decoder 510 is referred to as "Decoded data for machines" 512. This data may be considered as decoded or reconstructed video. However, in some implementations of this pipeline, this data may not have same or similar characteristics as the original video which was input to the VCM encoder 502. For example, this data may not be easily understandable by a human when rendering the data onto a screen. The output of VCM decoder is then input to one or more task neural networks 514. In the figure, for the sake of illustrating that there may be any number of task-NNs 514, there are three example task-NNs, and a nonspecified one (Task-NN X). The goal of VCM is to obtain a low bitrate representation of the input video while guaranteeing that the task-NNs still perform well in terms of the evaluation metric 516 associated to each task.

Figure 6:
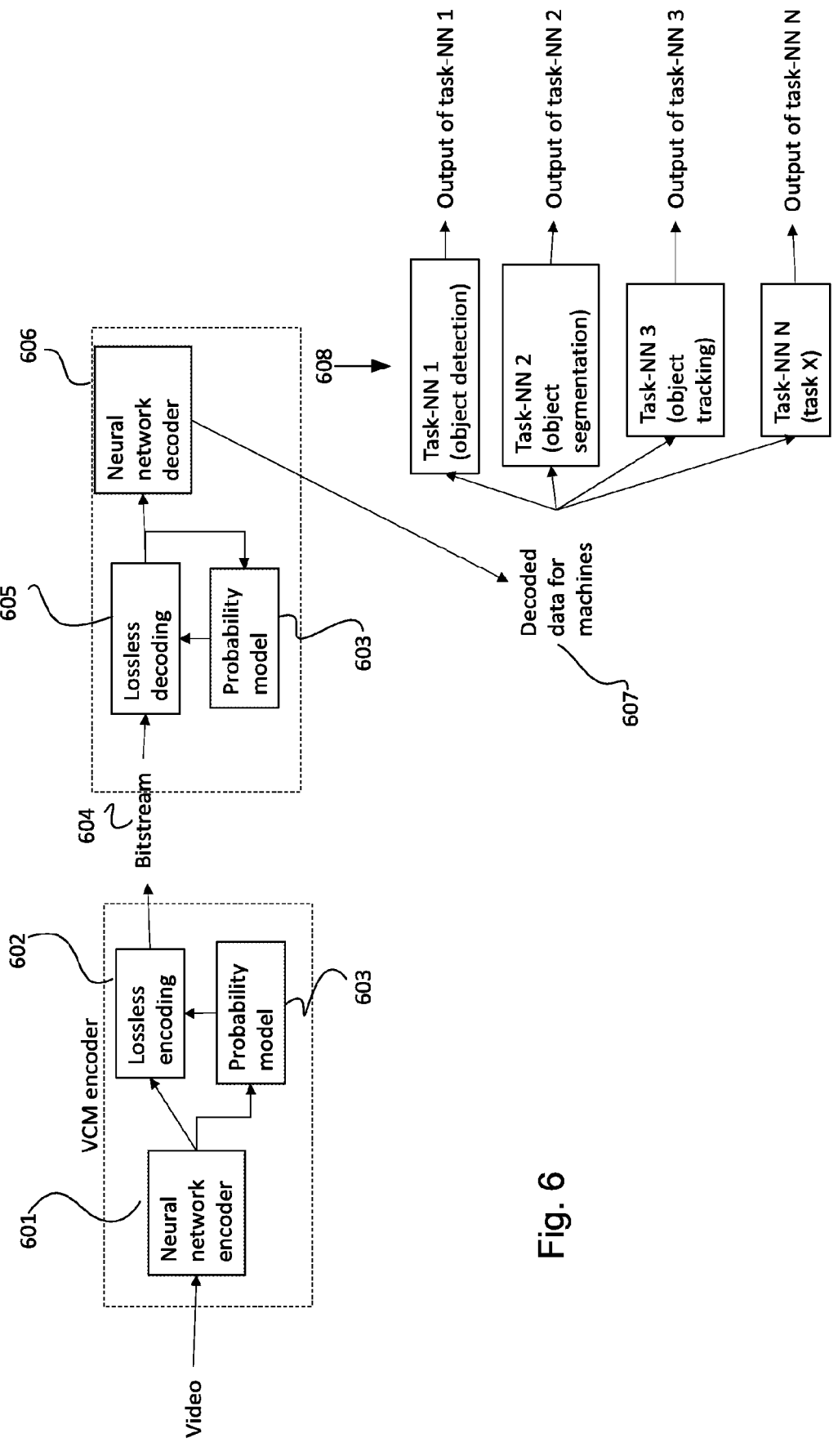
FIG. 6 shows an example of a pipeline for end-to-end learned system for video coding for machines.

One of the possible approaches to realize video coding for machines is an end-to-end learned approach. In this approach, the VCM encoder and VCM decoder mainly consist of neural networks. FIG. 6 illustrates an example of a pipeline for the end-to-end learned approach. The video is input to a neural network encoder 601. The output of the neural network encoder 601 is input to a lossless encoder 602, such as an arithmetic encoder, which outputs a bitstream 604. The output of the neural network encoder 601 may be input also to a probability model 603 which provides to the lossless encoder 602 with an estimate of the probability of the next symbol to be encoded by the lossless encoder 602. The probability model 603 may be learned by means of machine learning techniques, for example it may be a neural network. At decoder-side, the bitstream 604 is input to a lossless decoder 605, such as an arithmetic decoder, whose output is input to a neural network decoder 606. The output of the lossless decoder 605 may be input to a probability model 603, which provides the lossless decoder 605 with an estimate of the probability of the next symbol to be decoded by the lossless decoder 605. The output of the neural network decoder 606 is the decoded data for machines 607, that may be input to one or more task-NNs 608.

Figure 7:
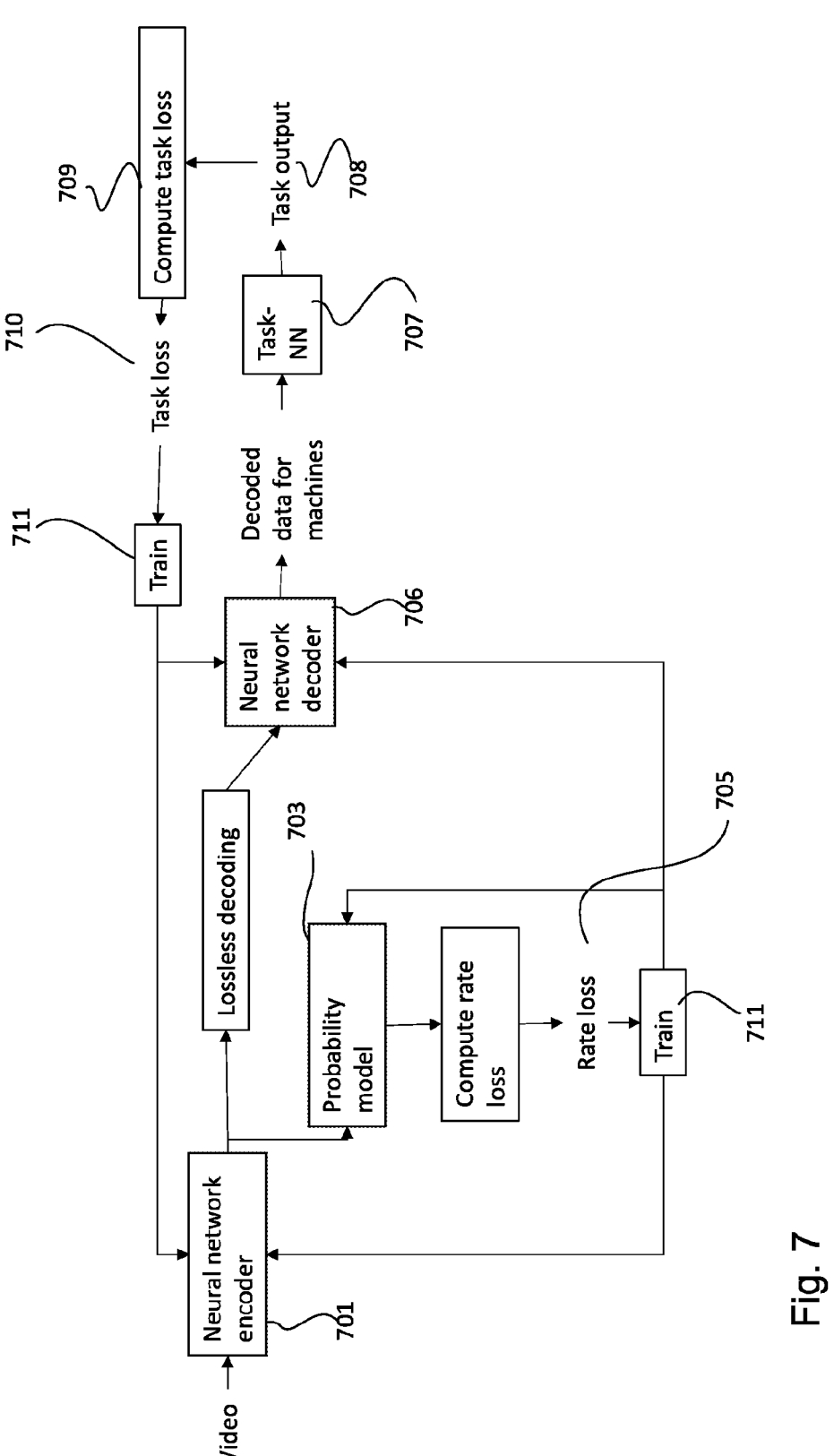
FIG. 7 shows an example of training an end-to-end learned codec.

FIG. 7 illustrates an example of how the end-to-end learned system may be trained for the purpose of video coding for machines. For the sake of simplicity, only one task-NN 707 is illustrated. A rate loss 705 may be computed from the output of the probability model 703. The rate loss 705 provides an approximation of the bitrate required to encode the input video data. A task loss 710 may be computed 709 from the output 708 of the task-NN 707.

The rate loss 705 and the task loss 710 may then be used to train 711 the neural networks used in the system, such as the neural network encoder 701, the probability model 703, the neural network decoder 706. Training may be performed by first computing gradients of each loss with respect to the trainable neural networks' parameters that are contributing or affecting the computation of that loss. The gradients are then used by an optimization method, such as Adam, for updating the trainable parameters of the neural networks.

The machine tasks may be performed at decoder side (instead of at encoder side) for multiple reasons, for example because the encoder-side device does not have the capabilities (computational, power, memory) for running the neural networks that perform these tasks, or because some aspects or the performance of the task neural networks may have changed or improved by the time that the decoder-side device needs the tasks results (e.g., different or additional semantic classes, better neural network architecture). Also, there could be a customization need, where different clients would run different neural networks for performing these machine learning tasks.

In some video codecs, a neural network may be used as a filter in the decoding loop, and it may be referred to as neural network loop filter, or neural network in-loop filter. The NN loop filter may replace all other loop filters of an existing video codec or may represent an additional loop filter with respect to the already present loop filters in an existing video codec. In the context of image and video enhancement, a neural network may be used as post-processing filter, for example applied to the output of an image or video decoder in order to remove or reduce coding artifacts.

Content adaptation may be performed by having the encoder-side device compute an adaptation signal for one or more NNs used at decoder side (i.e., decoder-side NNs), and signalling the adaptation signal or signal derived from the adaptation signal to the decoder side. In one example, a decoder-side NN may be a NN filter. In another example, a decoder-side NN may be a NN that is part of an end-to-end trained decoder. A module or process at decoder side may use the adaptation signal or a signal derived from the adaptation signal to update or adapt one or more NN. The updated or adapted one or more NNs are then used for their purposes, e.g., for filtering a reconstructed image block or patch.

The adaptation signal may be compressed in a lossy and/or lossless way. When the adaptation signal is compressed, the decoder side may first need to decompress the compressed adaptation signal before using it for updating or adapting the NNs.

In this disclosure terms "further training", "finetuning", "overfitting", "adapting" are used interchangeably to refer to the same operation, i.e., making a part of the codec (such as the parameters of a NN) or a signal produced by the codec more specific to the input content in order to improve the rate-distortion performance for that input content. Also, the "input" or "input content" may refer to one or more images, one or more frames of a video sequence, one or more blocks or slices of an image, one or more blocks or slices of a frame in a video sequence.

At encoding phase ("inference phase" for NNs) when a new input content needs to be encoded (such as an input image or video sequence), the encoder may decide to optimize some part of the codec or some signal produced by the codec or a post-processing operation, with respect to the specific input content. The optimization may be performed at encoder-side, and may comprise computing a loss function using the output of the decoder and/or the output of a post-processing operation and/or the output of the encoder, and differentiating the computed loss function with respect to the parameters or signal to be optimized.

When the parameters to be optimized are at least some of the parameters of a decoder-side NN (for example the parameters of a post-processing neural network), an update to those parameters (here referred to as a "weight-update") may need to be encoded and signaled to the decoder-side. The bitrate of the bitstream representing such signaling is an additional bitrate with respect to the bitrate of the bitstream representing the encoded image or video without any content adaptation.

The present embodiments provide methods for compressing a weight-update of a decoder-side NN (DSNN). The DSNN may be, for example, a loop filter NN or a post-processing filter NN or a decoder neural network of an end-to-end learned codec.

A weight-update may be computed by means of a training or finetuning process. For example, the weight-update may be determined by finetuning one or more parameters of a decoder-side NN by using at least a data item (e.g., an image, a video, etc.) that is input to an encoder. The weight-update computation may be performed by an encoder-side device.

According to one of the proposed embodiments, one or more configuration parameters of one or more coding tools of the weight-update codec are optimized (i.e., finetuned) iteratively. The one or more coding tools may be part of the weight-update encoder only, or part of the weight-update decoder only, or both. At each iteration, a certain value for each of the one or more configuration parameters is used to compress the weight-update. A bitrate of the compressed weight-update is computed. The compressed weight-update is decompressed. The decompressed weight-update may be used for updating the DSNN. A reconstruction quality of the decompressed weight-update may be computed. A reconstruction quality of the video that is decoded and eventually post-processed by using the updated DSNN may be computed. A bitrate of the encoded video, where encoding and/or decoding and/or post-processing is performed by using the update DSNN may be computed. A score is computed by using at least one or more of the following:

the reconstruction quality of the decompressed weight-update;

the bitrate of the compressed weight-update;

the reconstruction quality of the decompressed and eventually post-processed video;

the bitrate of the encoded video.

The computed score represents the goodness of the considered value for each of the one or more configuration parameters of the one or more coding tools of the weight-update codec. In different iterations, the value of at least one configuration parameter of at least one coding tool of the weight-update codec is changed. Thus, at each iteration, a new configuration of the codec is tested. After the iterative process is completed, the configuration parameters' values which yield the highest scores are selected and used for the final compression and/or decompression of the weight-update.

The coding tools may include, for example, a uniform quantization operation.

According to an embodiment, the score may be derived based at least on the gain in video reconstruction quality.

According to another embodiment, the score may be derived based at least on a difference between the overall bitrate incurred when the system (e.g., the codec and the DSNN) uses the tested values for the configuration parameters for coding the weight-update and the bitrate incurred when the system does not use any weight-update signalling, at same or substantially same video reconstruction quality.

According to another embodiment, the score may be derived based at least on a computed slope of a line segment passing through a first point representing the rate-distortion (or rate-quality) performance of the system when no weight-update is signaled and a second point representing the rate-distortion (or rate-quality) performance of the system when the weight-update is coded using the tested value for the configuration parameters for the coding tools of the weight-update codec.

In the following, details on the present embodiments are discussed. The embodiments relate to compressing and decompressing data. For the sake of simplicity, the embodiments use video as an example of the data type. However, the proposed embodiments can be extended to other types of data such as images, audio, etc.

An encoder-side device performs a compression or encoding operation by using an encoder. A decoder-side device performs decompression or decoding operation by using a decoder. The encoder-side device may also use some decoding operations, for example in a coding loop. Such decoding operations occurring at the encoder are referred to as "en-decoding". The encoder-side device and the decoder-side device may be the same physical device, or different physical devices.

The decoder or the decoder-side device contains one or more neural networks, here referred to as decoder-side neural networks (DSNNs). The encoder or the encoder-side device may also contain one or more neural networks, which corresponds to the decoder-side neural networks (DSNNs). Such encoder-side DSNNs are referred to as en-DSNNs. Some examples of DSNNs and en-DSNNs may be the following:

A post-processing NN filter (here also referred to as post-filter, or NN post-filter, or post filter NN), which is applied on at least one of the outputs of an end-to-end learned decoder or of a conventional decoder (i.e., not comprising neural networks or other components leaned from data) or of a hybrid decoder (i.e., a decoder comprising one or more neural networks or other components learned from data).

A NN in-loop filter (here also referred to as in-loop NN filter, or NN loop filter, or loop NN filter), used within an end-to-end learned decoder, or within a hybrid decoder.

A learned probability model (e.g., a NN) that is used for providing estimates of probabilities of symbols to be encoded and/or decoded by a lossless coding module, within an end-to-end leaned codec or within a hybrid codec.

A decoder neural network for an end-to-end leaned codec.

For the sake of simplicity, a single DSNN or a single en-DSNN may be used as an example when describing some of the embodiments. Also, for the sake of simplicity, a post-filter NN may be used as an example of a DSNN or an en-DSNN when describing some of the embodiments.

Figure 8:
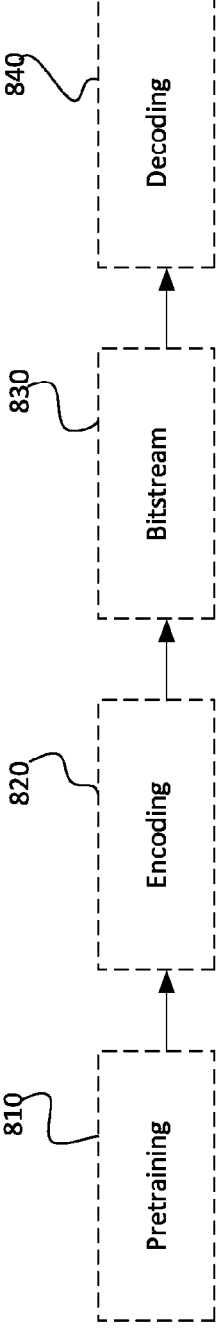
FIG. 8 shows an overview of different stages of present embodiments.

FIG. 8 illustrates an example of a high-level overview of different stages considered in the present embodiments. As shown in the example of FIG. 8, the different stages comprise pretraining 810, encoding 820, bitstream 830 and decoding 840. These stages are discussed in more detailed manner with reference to FIGS. 9-11.

Pretraining

Figure 9:
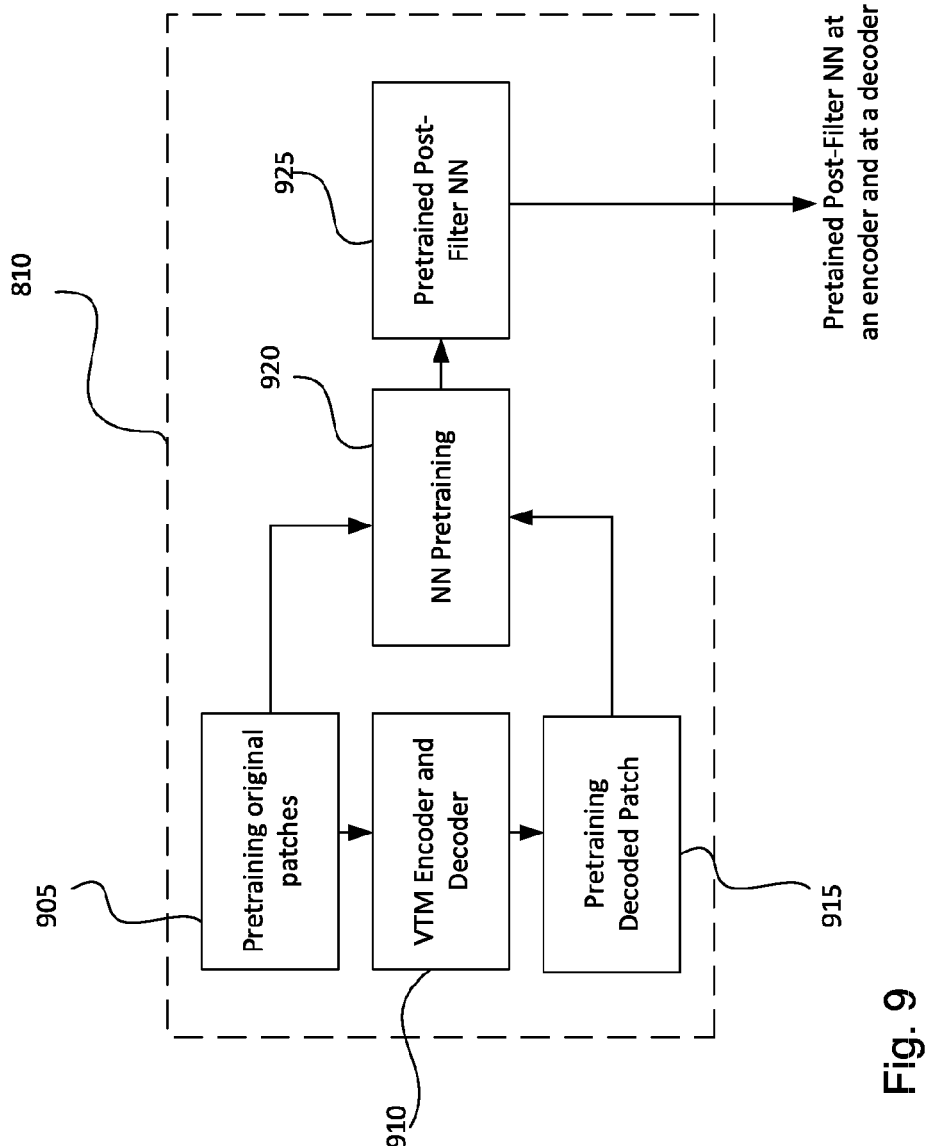
FIG. 9 shows an example of pretraining.

FIG. 9 illustrates the pretraining stage 810, or simply a training stage, which comprises training one or more DSNNs (including also en-DNSSs). The pretraining stage may be performed offline, for example during a development phase of the codec, or during the development phase of the one or more (en-) DSNNs, or during a continuous development cycle of the codec and/or the one or more (en-)DSNNs. The pretraining stage is an optional stage for the present solution. As an alternative, the (en-)DSNN may not be pretrained and instead the values of its weights or parameters may be initialized by other means, such as by using stochastic initialization methods.

In FIG. 9, a conventional codec (such as, but not limited to, the VTM encoder and decoder 910 that is illustrated in FIG. 9 as an example) is considered. NN Pretraining 920 refers to pretraining a (en-) DSNN, where the (en-)DSNN may be a post-processing NN filter, also referred to as "post-filter NN".

During or before the pretraining process starts, training data is obtained. Training data may comprise original input data 905 (e.g., patches extracted from uncompressed images or videos) and corresponding decoded data 915. The decoded data may be obtained by using the image or video codec to encode and decode the original input data. The original-decoded pairs of patches 905, 915 are used for training 920 the post-filter NN. The training 920 of the post-filter NN may comprise (1) Inputting the decoded data to the post-filter NN;

(2) Running the post-filter NN;

(3) Obtaining an output from the post-filter NN;

(4) Using the output of the post-filter NN and the original data for computing a loss, where the original data is used as ground-truth;

(5) The loss is used for training the post-filter NN.

For example, the loss may be differentiated with respect to one or more parameter of the post-filter NN. The one or more gradients are then used to update the one or more parameters of the post-filter NN, for example by using Stochastic Gradient Descent or Adam optimization functions. The process of inputting data to the post-filter NN, obtaining an output from the post-filter NN, computing a loss and updating the post-filter NN represents one iteration of the pretraining process. The pretraining process may perform one or more such iterations, until a stopping criterion is met.

The trained post-filter NN 925 is deployed into the encoder-side device and into the decoder-side device. The trained post-filter NN 925 may be delivered into the encoder-side device and into the decoder-side device by any means, such as but not limited to i) by pre-defining the trained post-filter NN (including its trained parameters) in a specification of a coding standard, thus the trained post-filter NN may be integrated in encoders and decoders; ii) out-of-band delivery prior to encoding or decoding of the video bitstream; iii) out-of-band delivery in relation to encoding or decoding of the video bitstream; iv) in-band delivery with the video bitstream to the decoder.

Encoding Operations

Figure 10:
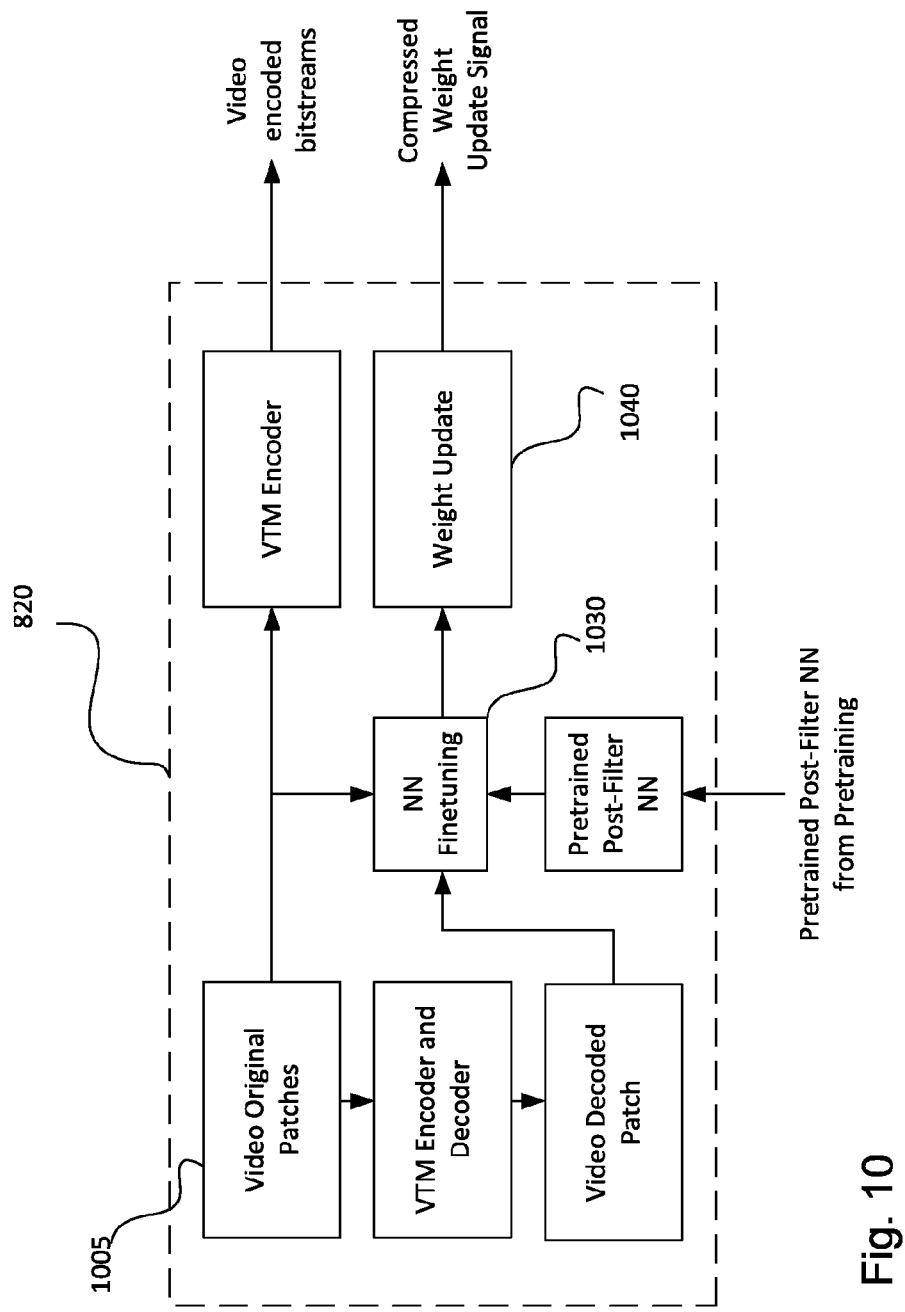
FIG. 10 shows an example of encoding.

FIG. 10 illustrates details of the encoding stage 820 (in FIG. 8 Encoding 820). The encoding 820 comprises fine-tuning 1030 the NN filter (i.e., post-filter NN, i.e., en-DSNN), encoding the input data (video original patches 1005), and computing and encoding a weight-update 1040. The NN filter of the encoder is a copy of a NN filter at the decoder comprising also some decoding operations and/or post-processing operations. This means that en-DSNN is a NN available at encoder side to perform decoding operations and/or post-processing operations similarly as at the decoder.

The finetuning 1030 is performed in order to achieve content adaptation, i.e., to adapt the en-DSNN to the input data that is encoded by the encoder and used as a ground-truth. In this content adaptation process, at least one or more parameters of one or more en-DSNNs are finetuned by using a process similar to the pretraining process. The one or more parameters which are finetuned may comprise, for example, One or more trainable parameters of the kernels of the convolutional layers in the en-DSNN;

One or more bias parameters of the convolutional layers in the en-DSNN;

One or more parameters that multiply the output channels form the convolutional layers in the en-DSNN.

The finetuning 1030 is performed by using finetuning data. Finetuning data may comprise a set of input data for the en-DSNN and a set of corresponding ground-truth data. Both sets are derived from the data that needs to be encoded, i.e., the input data to the encoder. The input data to the en-DSNN may be data obtained by performing at least some of the encoding and decoding operations on the input data to the encoder. Thus, the input data to the en-DSNN may be referred to as processed data. The ground-truth data may be the input data to the encoder, which in some cases may be uncompressed or substantially uncompressed.

The finetuning 1030 may comprise one or more finetuning iteration rounds. In each finetuning iteration, the processed data is input to the en-DSNN. The en-DSNN is run and an output data from the en-DSNN is obtained. The output data from the en-DSNN, or data derived from the data output by the en-DSNN, and the ground-truth are used for computing a loss, such as a rate-distortion loss. The loss may be differentiated with respect to one or more parameters of the en-DSNN, thus obtaining one or more gradients of the loss with respect to the one or more parameters of the en-DSNN. The gradients are then used for updating the one or more parameters of the en-DSNN, by using an optimization routine such as Stochastic Gradient Descent (SGD). At this point, a finetuning iteration is completed. There may be one or more finetuning iterations, until a stopping condition is satisfied. A stopping condition may be based on one or more of the following conditions: a predefined number of iterations has been reached, a predefined value of the loss has been reached, a predefined value of the distortion metric has been reached, etc. For example, the optimization may stop when the loss does not decrease more than a predetermined amount, during a predetermined temporal span.

After the finetuning 1030 has completed, a weight-update 1040 may be computed. A weight-update 1040 may comprise the finetuned parameters or values derived from the finetuned parameters, such as differences between the finetuned parameters and the non-finetuned parameters. The weight-update 1040 may be compressed using a lossy or lossless codec (this is a different codec than the codec used for encoding and decoding the input data of the whole system, such as the data input to a video codec), referred to as weight-update codec. The weight-update codec may use several coding tools, such as sparsification, quantization, predictive coding, entropy coding. Sparsification may comprise setting to zero the values which are below a predetermined threshold. Quantization may comprise converting the weight-update from floating point 32 bits values to fixed-point 8 bits values. In predictive coding, the decoder-side device may predict the updates, and the encoder may signal only a residual (the prediction error). This prediction error may further be compressed by quantization and lossless coding. The bitstream representing the encoded weight-update may be signaled to the decoder-side device in or along the bitstream representing the encoded video. In one example, the bitstream representing the encoded weight-update may be signaled within one or more Supplemental Enhancement Information (SEI) messages. In another example, the bitstream representing the encoded weight-update may be signaled within one or more Adaptation Parameter Sets (APS).

Decoding Operations

Figure 11:
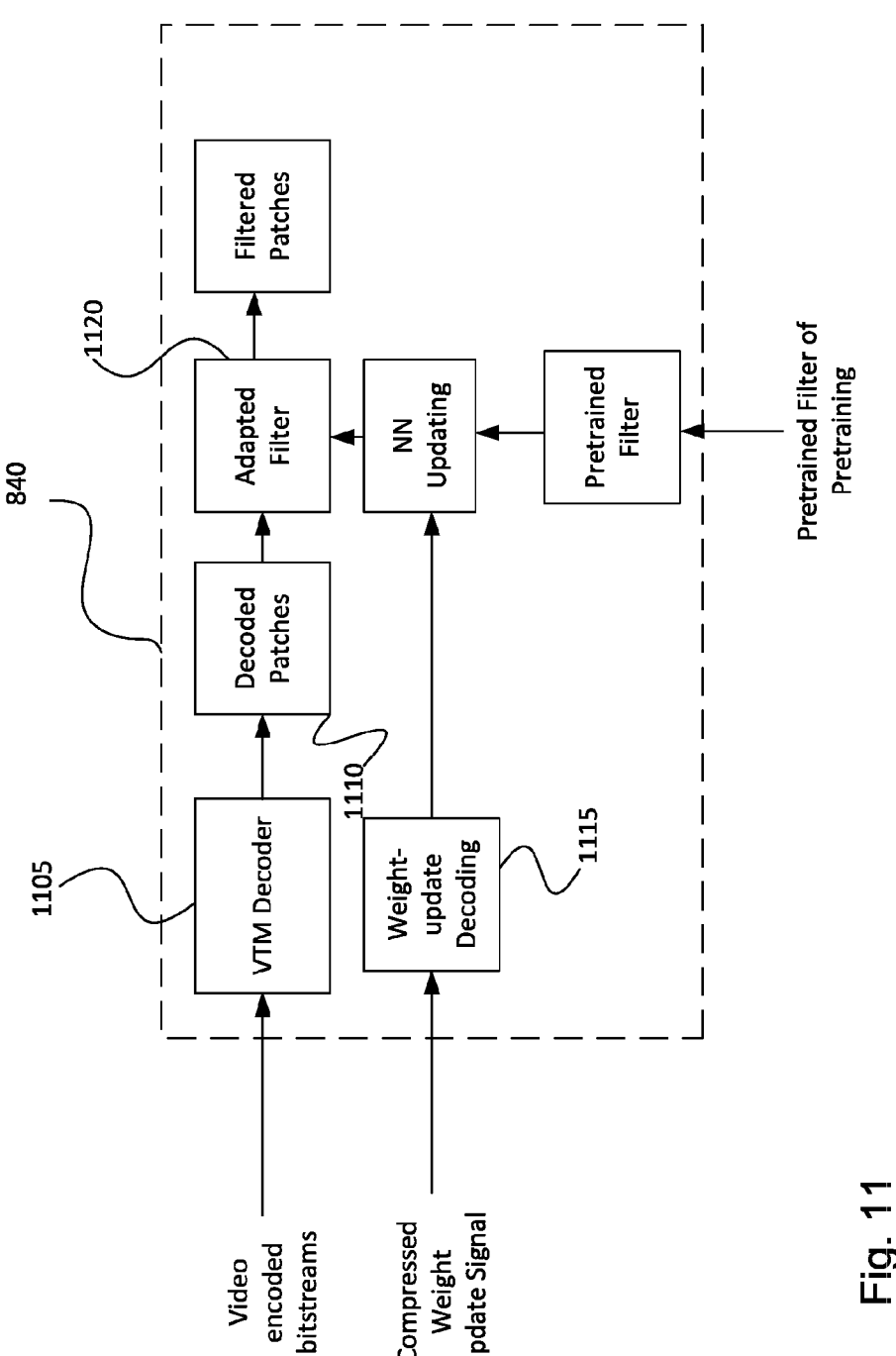
FIG. 11 shows an example of decoding.

FIG. 11 illustrates details for a decoding 840, according to an embodiment (block 840 in FIG. 8). The decoding comprises decoding 1105 the video bitstream by the codec, thus obtaining decoded patches 1110 or video. The encoded weight-update is decoded 1115. The decoded weight-update is used to update the post-filter NN (i.e., DSNN). The updated post-filter NN 1120 is used to filter the decoded video.

Example Implementation of a System Comprising a Conventional Codec and a Post-Filter NN According to one example, the considered system comprises a conventional codec (i.e., a codec that does not include neural networks, such as a codec conformant to the VVC/H.266 standard specification) and a post-filter NN. In this example, the post-filter NN is a convolutional neural network. The architecture of the post-filter may comprise convolutional layers and non-linear functions. An input video is provided to the encoder. The encoder outputs a bitstream representing an encoded video. The bitstream is input to the decoder. The decoder decodes the video. The codec may perform lossy compression and decompression. The post-filter NN takes as input at least the decoded video, for example one or more frames of the video, or one or more patches (blocks) of the video. The output of the post-filter NN is a post-processed decoded video. The aim of at least some of the embodiments is to improve the quality of the post-processed decoded video, i.e., to obtain a post-processed decoded video which is more similar to the video that is input to the encoder, according to one or more similarity metrics. One example of similarity metric is the Peak Signal-to-Noise Ratio (PSNR), which is computed based at least on the Mean Squared Error (MSE) metric, on the ground-truth video and on the post-processed decoded video. For this example system, content adaptation may be performed by the encoder-side device. The encoder-side device may finetune the bias parameters of the post-filter NN. The finetuning process may comprise minimizing a loss function, for example the MSE computed based on the video that is input to the encoder (used as ground-truth data) and based on the corresponding output from the post-filter NN, with respect to the bias parameters of the post-filter NN.

After the finetuning process terminates, a weight-update is computed, either as the bias parameters or as the difference between the finetuned bias parameters and the non-finetuned bias parameters. The computed weight-update may be encoded in lossy or lossless way.

The bitstream representing the encoded weight-update may be signaled to the decoder-side device. The decoder-side device may decode the encoded weight-update and then the decoded weight-update may be used for updating decoder's post-filter NN. The updated decoder's post-filter NN may then be used for decoding the video that is associated to the decoded weight-update.

Proposed Embodiments

The proposed embodiments address the problem of how to increase the rate-distortion performance of the codec (e.g., the video codec), for example by increasing the rate-distortion performance of the weight-update codec. Increasing the rate-distortion performance of a codec with respect to a baseline configuration of the same codec may refer to one or more of the following:

Decreasing the bitrate of a bitstream representing the encoded data, while keeping the distortion of the reconstructed data same (or substantially the same).

Decreasing the distortion of the reconstructed data, while keeping the bitrate of a bitstream representing the encoded data same (or substantially the same).

Decreasing a rate-distortion Lagrangian function, i.e., D+λR where D represents the distortion of the reconstructed data, λ represents the bitrate of a bitstream representing the encoded data, A represents the Lagrangian multiplier, which may be a scalar value that is predefined.

Increasing a coding gain, such as the Bjontegaard Delta-Rate (BD-rate).

According to one of the proposed embodiments, one or more configuration parameters of one or more coding tools of the weight-update codec are optimized iteratively. The one or more coding tools may be part of the weight-update encoder only, or part of the weight-update decoder only, or both. At each iteration, a certain value for each of the one or more configuration parameters is used to compress the weight-update. A bitrate of the compressed weight-update is computed. The compressed weight-update is decompressed. The decompressed weight-update may be used for updating the en-DSNN. A reconstruction quality of the decompressed weight-update may be computed. A reconstruction quality of the video decoded and eventually post-processed by using the updated en-DSNN may be computed. A bitrate of the encoded video, where encoding and/or decoding and/or post-processing is performed by using the updated en-DSNN may be computed. A score is computed by using at least one or more of the following:

The reconstruction quality of the decompressed weight-update.

The bitrate of the compressed weight-update.

The reconstruction quality of the decoded video or of the post-processed video.

The bitrate of the encoded video.

The computed score represents the goodness of the considered value for each of the one or more configuration parameters of the one or more coding tools of the weight-update codec. In different iterations, the value of at least one configuration parameter of at least one coding tool of the weight-update codec is changed. Thus, at each iteration, a new configuration of the codec is tested. After the iterative process completes, the configuration parameters' values which yield the highest scores are selected and used for the final compression and/or decompression of the weight-update.

According to an example, a coding tool of the weight-update codec may be a uniform quantization operation, and a configuration parameter may be a Quantization Parameter (QP) from which a quantization step is derived. According to another example, a coding tool of the weight-update codec may be a sparsification operation used for sparsifying the weight-updates, and a configuration parameter may be a sparsification threshold. The sparsification operation may comprise setting the weight-update values (or their absolute values) which are below the sparsification threshold to zero.

The score may directly or indirectly measure the rate-distortion performance.

According to one embodiment, the score may be derived based at least on the gain in video reconstruction quality, where the gain is computed as the difference between the video reconstruction quality when using the tested configuration of the weight-update codec and the video reconstruction quality when using the baseline configuration of the weight-update codec. According to one example, the video reconstruction quality may be measured by the PSNR, thus the score may be the PSNR gain achieved by the video codec when using the tested configuration of the weight-update codec for compressing and decompressing a weight-update for a post-filter NN, with respect to when using a baseline configuration of the weight-update. The PSNR is computed between the reconstructed video and a reference video such as an uncompressed video or a substantially uncompressed video.

According to one embodiment, the score may be derived based at least on the video reconstruction quality, computed based on a distortion of the reconstructed video when using the tested configuration of the weight-update codec, in relation to a reference video such as the video that is input to the video encoder. In one example, the video reconstruction quality may be measured by the PSNR, thus the score may be the PSNR achieved by the video codec when using the tested configuration of the weight-update codec for compressing and decompressing a weight-update for a post-filter NN, where the reference video for computing the PSNR is the uncompressed video that is input to the video encoder.

According to another embodiment, the score may be derived based at least on the gain in weight-update reconstruction quality, i.e., the difference between the weight-update reconstruction quality when using the tested configuration of the weight-update codec and the weight-update reconstruction quality when using the baseline configuration of the weight-update codec. For example, the weight-update reconstruction quality may be computed based on a distortion between the reconstructed weight-update and the uncompressed weight-update.

According to another embodiment, the score may be derived based at least on the weight-update reconstruction quality, where the weight-update reconstruction quality may be computed based on a distortion between the reconstructed weight-update and the uncompressed weight-update.

According to another embodiment, the score may be derived based at least on a difference between the overall bitrate incurred when the system (e.g., the codec and the DSNN) using the tested configuration of the weight-update codec and the bitrate incurred when the system does not use any weight-update signaling, at same or substantially same video reconstruction quality. For example, the overall bitrate may be the sum of the bitrate of the bitstream representing the encoded video and the bitrate of the bitstream representing the encoded weight-update for a post-filter NN. If there is no available information about the bitrate incurred when the system does not use any weight-update signaling at same or substantially same video reconstruction quality, a second bitrate value may be considered, such as the bitrate value obtained by first interpolating two available rate-distortion (or rate-quality) points in a rate-distortion (or rate-quality) space for the system not using any weight-update signaling, and then considering the bitrate value on the interpolated line where the video reconstruction quality is same or substantially same as the video reconstruction quality of the system using the weight-update signaling. Mathematically, this corresponds to $b_{base}=IRQ(Q_{tested})$, where $Q_{tested}$ is the video reconstruction quality of the system using the weight-update signaling, IRQ( ) is the interpolated rate-quality function for the system not using any weight-update signaling, and $b_{base}$ is the bitrate of the system not using nay weight-update signaling in correspondence of the video reconstruction quality $Q_{tested}$. According to another example, the second bitrate value may be obtained using a piecewise polynomial interpolation fitted curve that goes through multiple rate-distortion (or rate-quality) points achieved by the system not using any weight-update signaling. Given the fitted curve, the second bitrate value is derived from the point on the curve with the same video reconstruction quality. According to yet another example, when only one rate-distortion point that is achieved by the system not using any weight-update signaling is available, an estimation of the rate-distortion curve may be used to determine the second bitrate value.

According to an example two rate-quality points are available for the system not using the weight-update signaling, where the quality is the video reconstruction quality, measured as PSNR. The two points are interpolated by linear interpolation, thus obtaining a line or a line segment passing through the two points. A weight-update is compressed and decompressed by using a certain configuration of the weigh-update codec. A first PSNR and a first overall bitrate of the system using the weight-update signaling is recorded. A second bitrate value is obtained as the bitrate value of the rate-quality point on the interpolated line in correspondence of the first recorded PSNR. The difference between the second bitrate value and the first bitrate value is an example of the score computed according to this embodiment. The values of the configuration parameters of the coding tools used for obtaining the highest score may then be used for the final compression and/or decompression of the weight-update.

According to another embodiment, the score may be derived based at least on a difference between the video reconstruction quality incurred when the system (e.g., the codec and the DSNN) uses the considered value for coding the weight-update and the video reconstruction quality incurred when the system does not use any weight-update signaling, at same or substantially same overall bitrate. For example, the overall bitrate may be the sum of the bitrate of the bitstream representing the encoded video and the bitrate of the bitstream representing the encoded weight-update for a post-filter NN. If there is no available information about the video reconstruction quality incurred when the system does not use any weight-update signaling at same or substantially same bitrate, a second video reconstruction quality value may be considered, such as the video reconstruction quality value obtained by first interpolating two available rate-distortion (or rate-quality) points in a rate-distortion (or rate-quality) space for the system not using any weight-update signaling, and then considering the video reconstruction quality value on the interpolated line where the bitrate value is same or substantially the same as the bitrate of the system using the weight-update signaling. According to another example, the second video reconstruction quality value may be obtained using a piecewise polynomial interpolation fitted curve that go through multiple rate-distortion (or rate-quality) points achieved by the system not using any weight-update singling. Given the fitted curve, the second video reconstruction quality value is derived from the point on the curve with the same or substantially same bitrate. In yet another example, when only one rate-distortion point that is achieved by the system not using any weight-update signaling is available, an estimation of the rate-distortion curve may be used to determine the second video reconstruction quality value.

According to another embodiment, the score may be derived based at least on a computed slope or approximation of a slope of a line segment passing through a first point representing the rate-quality performance of the system when no weight-update is signaled and a second rate-quality point representing the rate-distortion performance of the system when the weight-update is coded using the considered values for the configuration parameters.

According to one example, the video reconstruction quality is measured by PSNR. The slope is computed as (PSNR_tested−PSNR_ref)/(bitrate_tested−bitrate_ref), where PSNR_tested and bitrate_tested are the PSNR value for the reconstructed video and the overall bitrate value when the system uses weight-update signaling with the tested configuration of the weight-update codec; PSNR_ref and bitrate_ref are the PSNR value for the reconstructed video and the bitrate value when the system does not use any weight-update signaling. The values of configuration parameters for the coding tools of the weight-update codec which yield the highest slope are then used for the final compression and/or decompression of the weight-update.

According to another embodiment, the score may be derived based at least on the value of a rate-distortion Lagrangian function (as discussed above).

According to one embodiment, the score may be derived based at least on the video reconstruction quality, computed based on a distortion of the reconstructed video when using the tested configuration of the weight-update codec, wherein the score is derived from a spatial, temporal, or spatiotemporal portion of the reconstructed video compared to the reconstructed video to which the weight-update is applied; and the bitrate when the weight-update is applied.

Thus, less computation and memory resources may be required, and latency may be reduced compared to deriving the score from the entire reconstructed video to which the weight-update is applied.

According to one embodiment, the score derived from a spatial, temporal, or spatiotemporal portion of the reconstructed video may be extrapolated proportionally to cover the entire reconstructed video to which the weight-update is applied. In such extrapolation, the impact of the weight-update on video reconstruction quality may be considered to apply to the entire reconstructed video, whereas the bitrate of the weight-update is accounted only once. If the fine-tuned neural network is used for in-loop enhancement (e.g., in-loop filtering), such extrapolation may be considered to have a bitrate impact in the entire video that is proportional to the bitrate impact in the spatial, temporal, or spatiotemporal portion of the video.

The following may be applied when extrapolating the score derived from a spatial, temporal, or spatiotemporal portion of the reconstructed video. The score may be extrapolated proportionally to cover the entire reconstructed video to which the weight-update is applied. In some cases, a period of including a weight-update may be per-determined, e.g., once per a period of video intended to be transmitted as a delivery segment, or once per a predetermined random access point period. In some other cases, the entire reconstructed video to which the weight-update is applied may not be exactly known at the time of deriving and compressing the weight-update. In such other cases, one approach is to analyze the video ahead of the spatial, temporal, or spatiotemporal portion of the reconstructed video used for deriving the score and extrapolate the score to cover video with similar characteristics. Such analysis can, for example, include scene change detection and the score can be extrapolated up to a detected scene change (exclusive).

The method according to an embodiment is shown in FIG. 12. The method generally comprises receiving 1200 a representation of input media to be encoded; encoding 1210 the representation to generate encoded bitstreams to be delivered to a decoder, and using encoder's decoder-side neural network (en-DSNN) for decoding the encoded representation and/or post-processing the decoded representation; adapting 1220 the en-DSNN based at least on the representation or a signal derived from the representation and on an output of the en-DSNN or a signal derived from an output of the en-DSNN, thus obtaining a weight-update as a result; performing one or more iterations of compressing 1230 and decompressing the weight-update by using a weight-update codec; selecting 1240 values of one or more configuration parameters of the weight-update codec and using the selected values for a final compression of the weight-update; and signaling 1250 the compressed weight update to a decoder. Each of the steps can be implemented by a respective module of a computer system.

An apparatus according to an embodiment comprises means for receiving a representation of input media to be encoded; means for encoding the representation to generate encoded bitstreams to be delivered to a decoder, and means for using encoder's decoder-side neural network (en-DSNN) for decoding the encoded representation and/or post-processing the decoded representation; means for adapting the en-DSNN based at least on the representation or a signal derived from the representation and on an output of the en-DSNN or a signal derived from an output of the en-DSNN, thus obtaining a weight-update as a result; means for performing one or more iterations of compressing and decompressing the weight-update by using a weight-update codec; means for selecting values of one or more configuration parameters of the weight-update codec and using the selected values for a final compression of the weight-update; and means for signaling the compressed weight update to a decoder. The means comprises at least one processor, and a memory including a computer program code, wherein the processor may further comprise processor circuitry. The memory and the computer program code are configured to, with the at least one processor, cause the apparatus to perform the method of FIG. 12 according to various embodiments.

The method according to another embodiment is shown in FIG. 13. The method generally comprises receiving 1310 an encoded bitstream; obtaining 1320 a compressed weight-update signal; decompressing 1330 the compressed weight-update signal; adapting 1340 a decoder-side neural network (DSNN) based at least on the decompressed weight-update signal; and decompressing 1350 the bitstream and/or post-processing the decompressed bitstream to generate a representation of an output media, based at least on the adapted DSNN. Each of the steps can be implemented by a respective module of a computer system.

An apparatus according to an embodiment comprises means for receiving an encoded bitstream; means for obtaining a compressed weight-update signal; means for decompressing the compressed weight-update signal; means for adapting a decoder-side neural network (DSNN) based at least on the decompressed weight-update signal; means for decompressing the bitstream and/or for post-processing the decompressed bitstream to generate a representation of an output media, based at least on the adapted decoder-side neural network. The means comprises at least one processor, and a memory including a computer program code, wherein the processor may further comprise processor circuitry. The memory and the computer program code are configured to, with the at least one processor, cause the apparatus to perform the method of FIG. 13 according to various embodiments.

Figure 14:
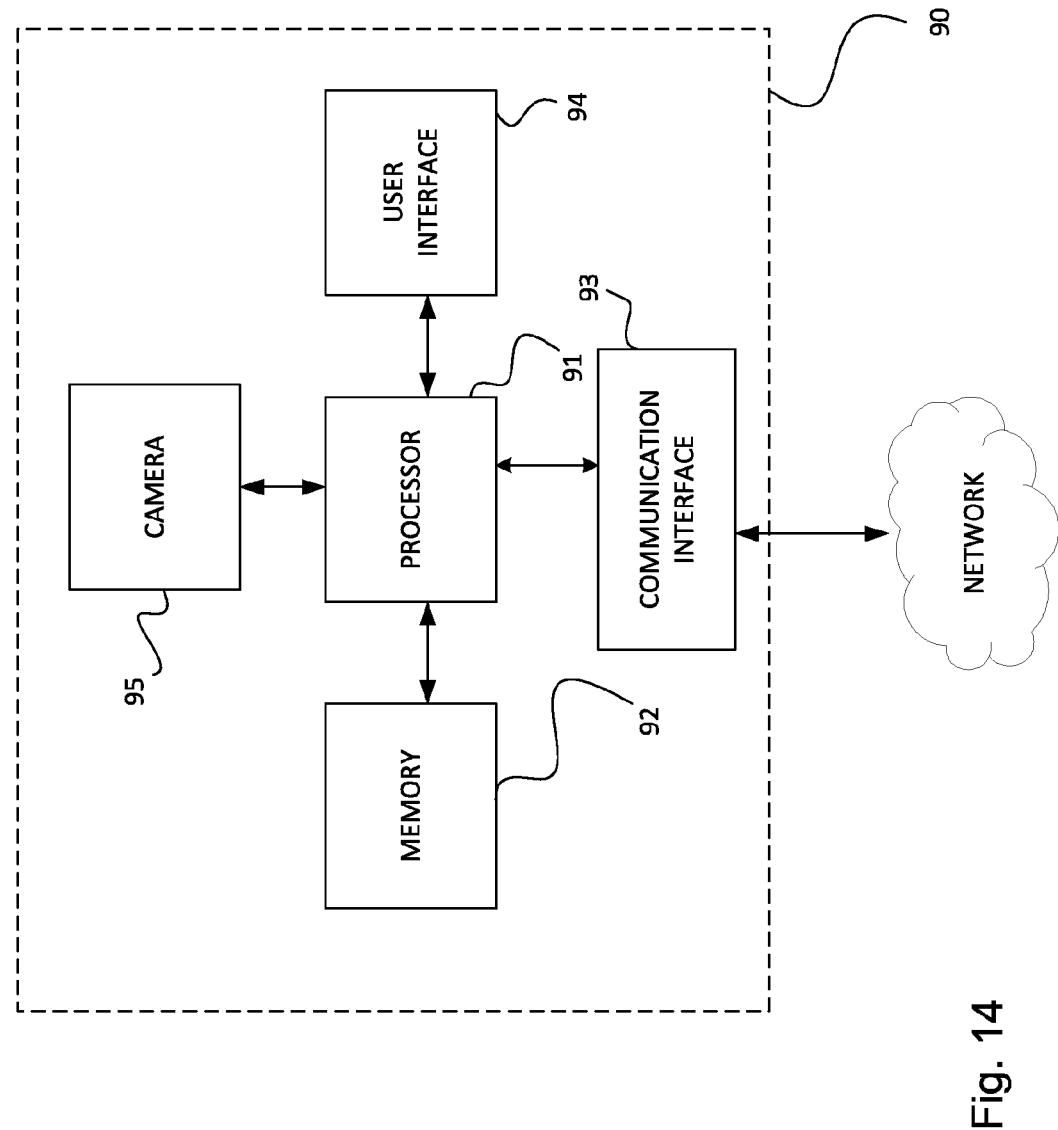
FIG. 14 shows an apparatus according to an embodiment.

An example of an apparatus is shown in FIG. 14. The apparatus is a user equipment for the purposes of the present embodiments. The apparatus 90 comprises a main processing unit 91, a memory 92, a user interface 94, a communication interface 93. The apparatus according to an embodiment, shown in FIG. 14, may also comprise a camera module 95. Alternatively, the apparatus may be configured to receive image and/or video data from an external camera device over a communication network. The memory 92 stores data including computer program code in the apparatus 90. The computer program code is configured to implement the method according to various embodiments by means of various computer modules. The camera module 95 or the communication interface 93 receives data, in the form of images or video stream, to be processed by the processor 91. The communication interface 93 forwards processed data, i.e., the image file, for example to a display of another device, such a virtual reality headset. When the apparatus 90 is a video source comprising the camera module 95, user inputs may be received from the user interface.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of various embodiments.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus comprising:
at least one processor; and
at least one memory including instructions;
wherein the at least one memory and the instructions are configured to, with the at least one processor, cause the apparatus at least to:
receive a representation of input media to be encoded;
encode the representation to generate encoded bitstreams to be delivered to a decoder;
use decoder-side neural network of an encoder (en-DSNN) to decode the encoded representation and/or post-processing the decoded representation;
adapt the en-DSNN based at least on the representation or a signal derived from the representation and on an output of the en-DSNN or a signal derived from an output of the en-DSNN to obtain a weight-update;
perform one or more iterations of compressing and decompressing the weight-update by using a weight-update codec, wherein for each iteration the apparatus is further caused to:
compress and/or decompress the weight-update based at least on tested values for one or more configuration parameters of a weight-update codec;
use the decompressed weight-update for updating the en-DSNN;
use the updated en-DSNN for decoding the encoded representation and/or for post-processing the decoded representation obtaining a reconstructed or processed representation;
compute a quality of the reconstructed or processed representation based at least on a quality metric computed based at least on the reconstructed or processed representation and on a ground-truth representation;
compute a score measuring rate-distortion performance for each of the tested values of one or more configuration parameters of the weight-update codec; and
select the tested values that yield the highest score;
use the selected tested values for a final compression of the weight-update; and
signal the compressed weight update to the decoder.

2. The apparatus according to claim 1, wherein the score is derived based on at least one of the following:
weight-update reconstruction quality;
difference between bitrates incurred when weight-update is not used and not signaled to the decoder compared to when weight-update is used and signaled to the decoder, at same or substantially same reconstructed or processed representation quality;
difference between a reconstructed or processed representation quality incurred when weight-update is used and signaled to the decoder compared to when weight-update is not used and not signaled to the decoder, at same or substantially same bitrate;

computed slope or an approximation of a slope of a line segment passing through a first rate-quality point representing the case when weight-update is used and signaled to the decoder and a second rate-quality point representing the case when weight-update is not used and is not signaled to the decoder;
value of a rate-distortion Lagrangian function; or
spatial, temporal or spatiotemporal portion of the reconstructed representation.

3. A method for encoding comprising:
receiving a representation of input media to be encoded;
encoding the representation to generate encoded bitstreams to be delivered to a decoder;
using decoder-side neural network of an encoder (en-DSNN) to decode the encoded representation and/or post-processing the decoded representation;
adapting the en-DSNN based at least on the representation or a signal derived from the representation and on an output of the en-DSNN or a signal derived from an output of the en-DSNN, to obtain a weight-update;
performing one or more iterations of compressing and decompressing the weight-update by using a weight-update codec, wherein for each iteration the method comprises:
compressing and/or decompressing the weight-update based at least on tested values for one or more configuration parameters of a weight-update codec;
using the decompressed weight-update for updating the en-DSNN;
using the updated en-DSNN for decoding the encoded representation and/or for post-processing the decoded representation obtaining a reconstructed or processed representation;
computing a quality of the reconstructed or processed representation based at least on a quality metric computed based at least on the reconstructed or processed representation and on a ground-truth representation;
computing a score measuring rate-distortion performance for each of the tested values of one or more configuration parameters of the weight-update codec; and
selecting the tested values that yield the highest score;
using the selected tested values for a final compression of the weight-update; and
signaling the compressed weight update to the decoder.

4. The method according to claim 3, wherein the score is derived based on at least one of the following:
weight-update reconstruction quality;
difference between bitrates incurred when weight-update is not used and not signaled to the decoder compared to when weight-update is used and signaled to the decoder, at same or substantially same reconstructed or processed representation quality;
difference between a reconstructed or processed representation quality incurred when weight-update is used and signaled to the decoder compared to when weight-update is not used and not signaled to the decoder, at same or substantially same bitrate;
computed slope or an approximation of a slope of a line segment passing through a first rate-quality point representing the case when weight-update is used and signaled to the decoder and a second rate-quality point representing the case when weight-update is not used
and is not signaled to the decoder;

value of a rate-distortion Lagrangian function; and spatial, temporal or spatiotemporal portion of the recon-
structed representation.

* * * * *